US011138360B2

(12) United States Patent
Huang et al.

(10) Patent No.: US 11,138,360 B2
(45) Date of Patent: Oct. 5, 2021

(54) SEMICONDUCTOR DEVICE WITH FILLER CELL REGION, METHOD OF GENERATING LAYOUT DIAGRAM AND SYSTEM FOR SAME

(71) Applicant: TAIWAN SEMICONDUCTOR MANUFACTURING COMPANY LTD., Hsinchu (TW)

(72) Inventors: Po-Hsiang Huang, Tainan (TW); Chin-Chou Liu, Jhubei (TW); Sheng-Hsiung Chen, Zhubei (TW); Fong-Yuan Chang, Hsinchu (TW); Hui-Zhong Zhuang, Kaohsiung (TW); Meng-Hsueh Wang, Hsinchu (TW); Yi-Kan Cheng, Taipei (TW); Chun-Chen Chen, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 16/662,827

(22) Filed: Oct. 24, 2019

(65) Prior Publication Data

US 2020/0134125 A1 Apr. 30, 2020

Related U.S. Application Data

(60) Provisional application No. 62/753,269, filed on Oct. 31, 2018.

(51) Int. Cl.
*G06F 30/392* (2020.01)
*H01L 23/528* (2006.01)
(Continued)

(52) U.S. Cl.
CPC .......... *G06F 30/392* (2020.01); *G06F 30/394* (2020.01); *G06F 30/398* (2020.01);
(Continued)

(58) Field of Classification Search
USPC .......................................................... 716/106
See application file for complete search history.

(56) References Cited

U.S. PATENT DOCUMENTS 7,260,442 B2 8/2007 Hwang et al.
8,786,019 B2 7/2014 Wu et al.
(Continued)

FOREIGN PATENT DOCUMENTS

TW 201712809 4/2017
TW 201727769 8/2017
(Continued)

OTHER PUBLICATIONS

Office Action dated Dec. 14, 2020 for corresponding case No. TW 10921214710. (pp. 1-5).
(Continued)

*Primary Examiner* — Mohammed Alam
(74) *Attorney, Agent, or Firm* — Hauptman Ham, LLP

(57) ABSTRACT

A method of generating a layout diagram including a first level of metallization (M_1st level) including: identifying, in the layout diagram, a filler cell and a first functional cell substantially abutting the filler cell; the first functional cell including first and second side boundaries, first wiring patterns in the M_1st level, and representing corresponding first conductors in the first functional cell region; and first and second groups of cut patterns overlying corresponding portions of the first wiring patterns and being substantially aligned with the corresponding first and second side boundaries; adjusting one or more locations of corresponding one or more selected cut patterns of the second group thereby correspondingly elongating one or more selected ones of the first wiring patterns so as to be corresponding first elongated wiring patterns which extend across the second boundary of the first functional cell into the filler cell.

20 Claims, 16 Drawing Sheets

(51) Int. Cl.

| | |
|---|---|
| ***H01L 23/522*** | (2006.01) |
| ***G06F 30/394*** | (2020.01) |
| ***G06F 30/398*** | (2020.01) |
| ***G06F 119/18*** | (2020.01) |

(52) U.S. Cl.

CPC ........ *H01L 23/528* (2013.01); *H01L 23/5226* (2013.01); *G06F 2119/18* (2020.01)

(56) References Cited

U.S. PATENT DOCUMENTS

| | | | | |
|---|---|---|---|---|
| 9,256,709 | B2 | 2/2016 | Yu et al. | |
| 10,083,269 | B2 | 9/2018 | De Dood et al. | |
| 2012/0193792 | A1* | 8/2012 | Kim | H01L 21/2885 257/741 |
| 2014/0040838 | A1* | 2/2014 | Liu | G03F 1/36 716/53 |
| 2015/0143309 | A1* | 5/2015 | De Dood | G06F 30/39 716/107 |
| 2015/0198842 | A1* | 7/2015 | Kwak | H01L 27/1248 349/42 |
| 2015/0278429 | A1* | 10/2015 | Chang | G03F 1/36 716/52 |
| 2016/0163635 | A1* | 6/2016 | Yun | H01L 23/3192 257/508 |
| 2018/0225402 | A9 | 8/2018 | De Dood et al. | |

FOREIGN PATENT DOCUMENTS

| | | |
|---|---|---|
| TW | 201812748 | 4/2018 |
| TW | 201816897 | 5/2018 |
| TW | 201820395 | 6/2018 |
| TW | 201825298 | 7/2018 |
| TW | 201834208 | 9/2018 |
| WO | 2017222795 | 12/2017 |

OTHER PUBLICATIONS

Office Action dated Jun. 24, 2021 for corresponding case No. KR 10-2019-0136965. (pp. 1-5).

* cited by examiner

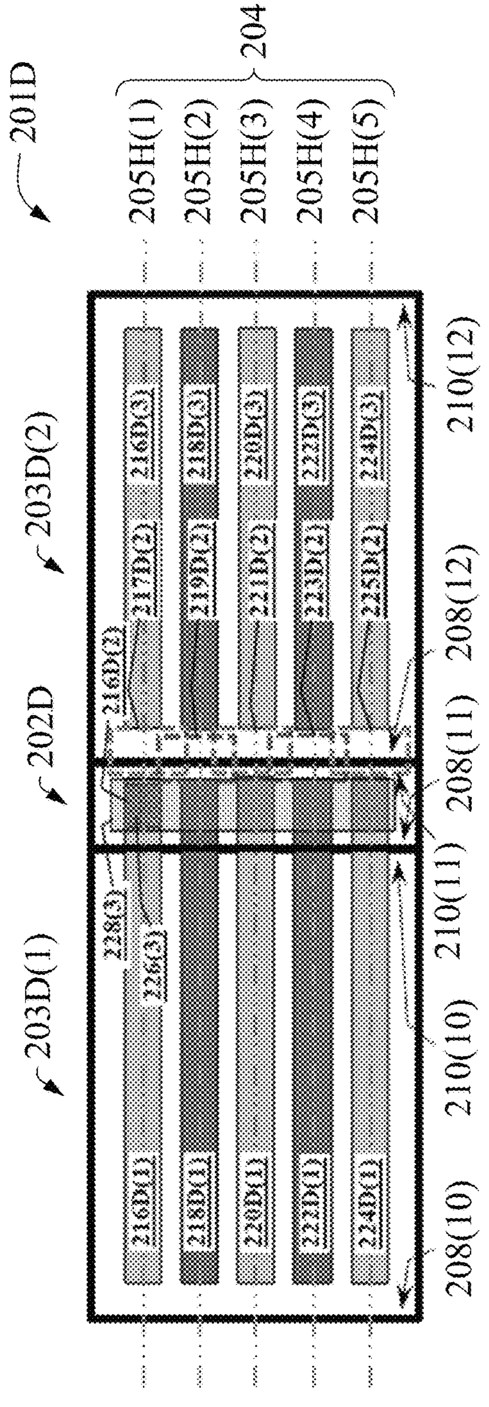
FIG. 2D
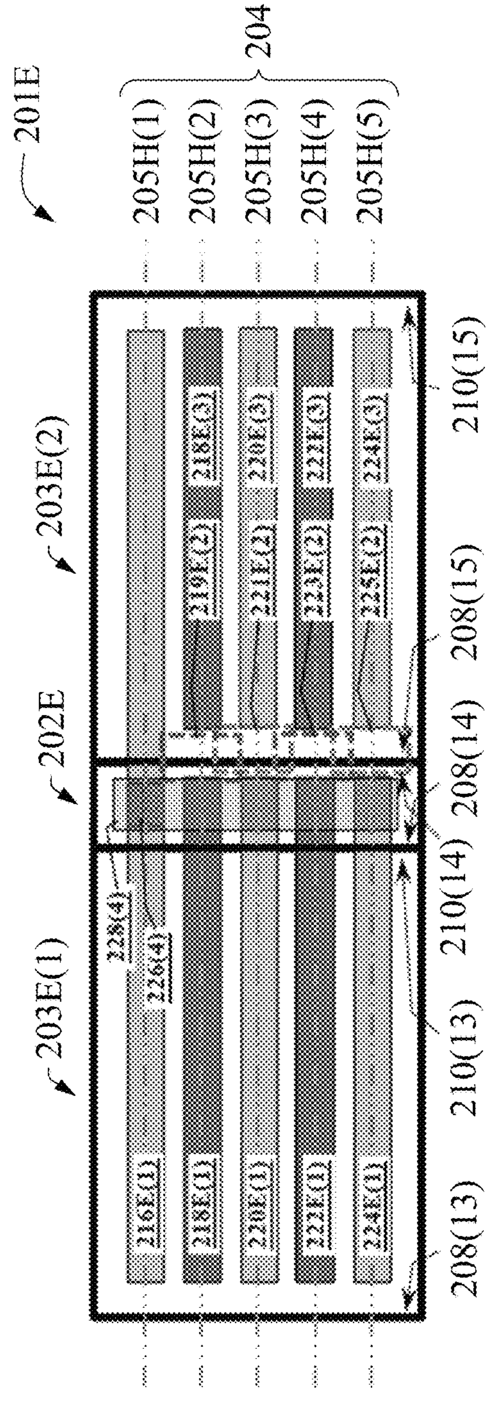
FIG. 2E
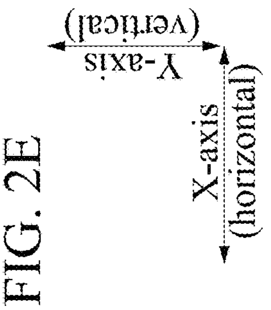

502
generate layout diagram

620
identify filler cell and abutting first functional cell

622
adjust locations of corresponding one or more selected cut patterns thereby correspondingly elongating one or more selected M_1st wiring patterns to be extended from first functional cell into filler cell

624
generate first via pattern

626
locate first via pattern over corresponding first one of elongated selected wiring patterns

628
generate second wiring pattern in M_2nd level

630
locate M_2nd wiring pattern over first via pattern so that M_2nd wiring pattern is resultantly located in filler cell

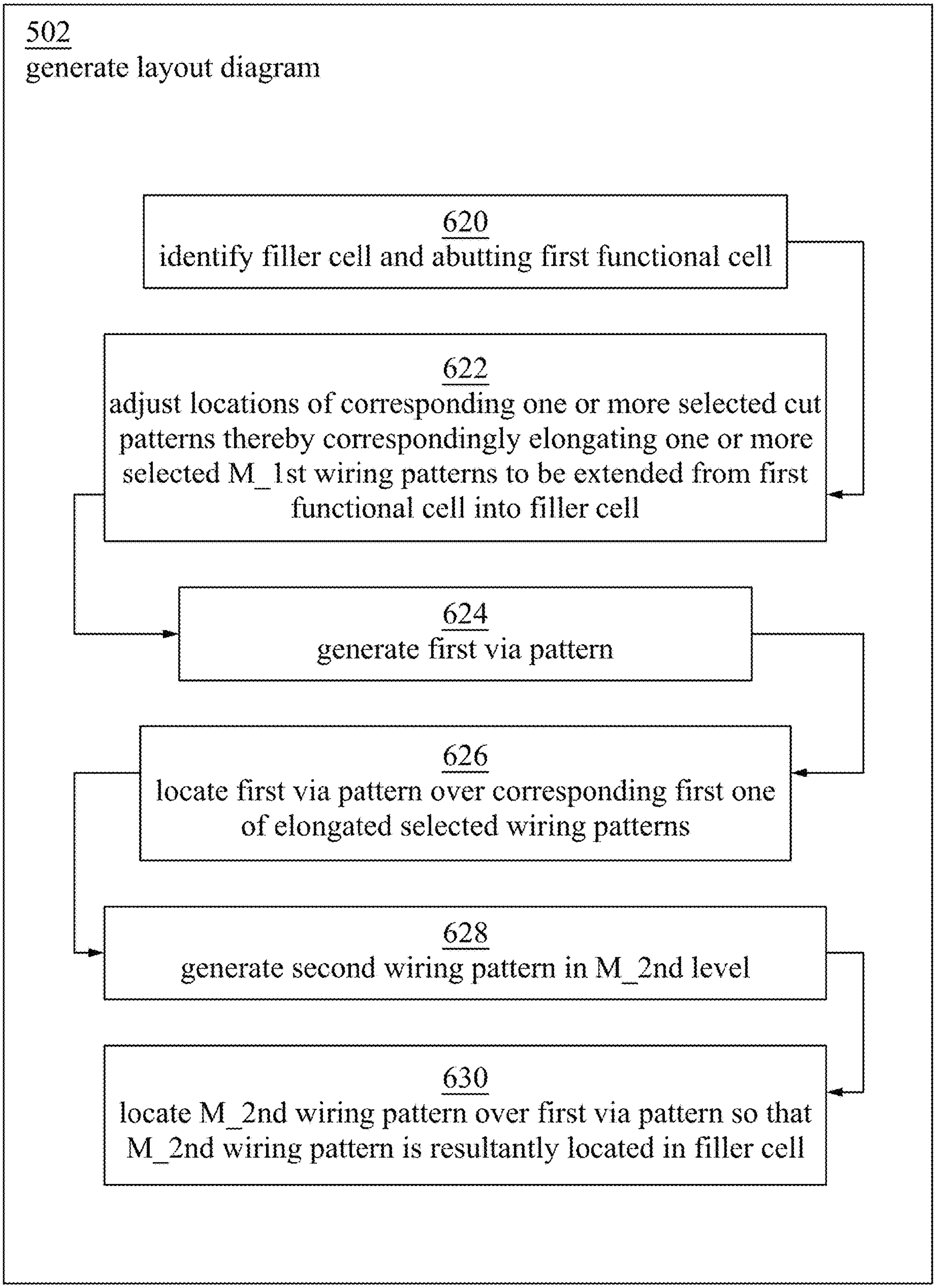

FIG. 6A

502
generate layout diagram

634
generate second via pattern

636
locate second via pattern over corresponding second one of second elongated selected wiring patterns

638
generate a second wiring pattern in M_2nd level

640
locate second M_2nd wiring pattern over second via pattern so that second M_2nd wiring pattern is resultanty located in filler cell

502
generate layout diagram

650
identify second functional cell abutting filler cell

652
adjust locations of corresponding one or more selected cut patterns thereby correspondingly elongating one or more selected wiring patterns to be extended from second functional cell into filler cell

SEMICONDUCTOR DEVICE WITH FILLER CELL REGION, METHOD OF GENERATING LAYOUT DIAGRAM AND SYSTEM FOR SAME

PRIORITY CLAIM

The present application claims the priority of U.S. Provisional Application No. 62/753,269, filed Oct. 31, 2018, which is incorporated herein by reference in its entirety.

BACKGROUND

An integrated circuit ("IC") includes one or more semiconductor devices. One way in which to represent a semiconductor device is with a plan view diagram referred to as a layout diagram. Layout diagrams are generated in a context of design rules. A set of design rules imposes constraints on the placement of corresponding patterns in a layout diagram, e.g., geographic/spatial restrictions, connectivity restrictions, or the like. Often, a set of design rules includes a subset of design rules pertaining to the spacing and other interactions between patterns in adjacent or abutting cells where the patterns represent conductors in a layer of metallization.

Typically, a set of design rules is specific to a process node by which will be fabricated a semiconductor device based on a layout diagram resulting. The design rule set compensates for variability of the corresponding process node. Such compensation increases the likelihood that an actual semiconductor device resulting from a layout diagram will be an acceptable counterpart to the virtual device on which the layout diagram is based.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

FIGS. 2A-2G are corresponding layout diagrams, in accordance with some embodiments.

FIGS. 6A-6C are corresponding flowcharts of corresponding methods of generating a layout diagram, in accordance with some embodiments.

DETAILED DESCRIPTION

Figure 1:
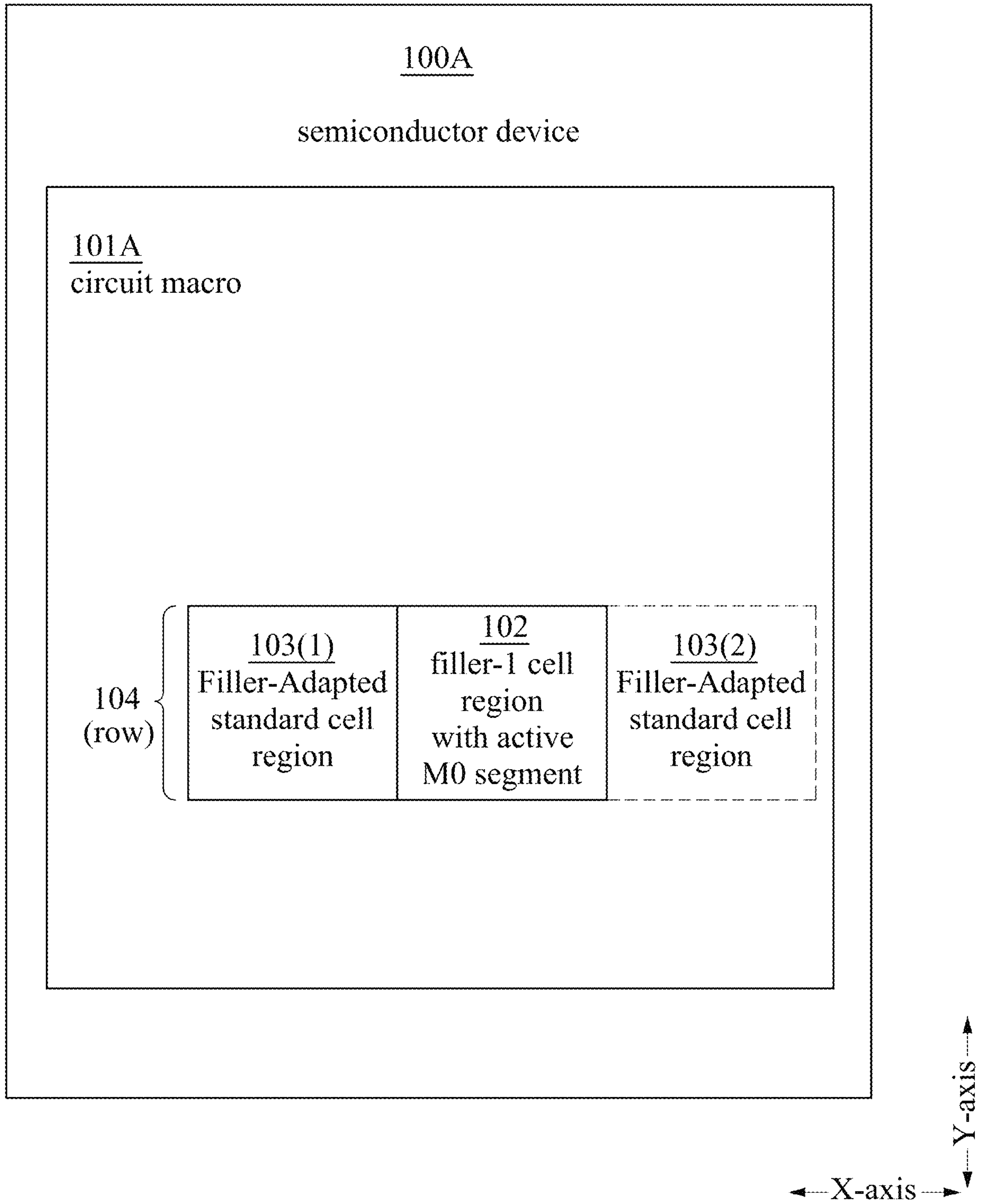
FIG. 1 is a block diagram of a semiconductor device in accordance with at least one embodiment of the present disclosure.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, a first functional cell has first wiring patterns in a first level of metallization (M_1st level). Where a filler cell abuts a first functional cell, a filler-cell-encroachment technique adjusts locations of cut patterns which has an effect of correspondingly elongating one or more selected ones of the first wiring patterns to extend across the second boundary of the first functional cell into the filler cell. In some embodiments, regarding filler cells that have a width of one contacted poly pitch (CPP) (filler-1 cells), the filler-cell-encroachment technique achieves a reduction in area of about 2.5% for a typical corresponding layout diagram. In some embodiments, regarding filler cells that have a width of substantially one contacted poly pitch (CPP) (filler-1 cells), the filler-cell-encroachment technique achieves a reduction in total wire length in a range from about 2.0% to about 3.0% for a typical corresponding layout diagram.

In FIG. 1, semiconductor device 100A includes, among other things, a circuit macro (hereinafter, macro) 10A. In some embodiments, macro 10A is an SRAM macro. In some embodiments, macro 10A is a macro other than an SRAM macro. Macro 10A includes, among other things, a filler cell region 102 and a filler-adapted standard cell region 103(1) which are disposed in a row 104. Example of layout diagrams resulting in filler cell region 102 and filler-adapted standard cell region 103(1) include the layout diagrams disclosed herein. In some embodiments, filler cell region 102 is a filler-1 cell region (discussed below).

Row 104 extends in a first direction. In FIG. 1, the first direction is the horizontal direction. Relative to the first direction, filler cell region 102 is abutted with filler-adapted standard cell region 103(1) at a first side of filler cell region 102. Standard cell region 103(1) is adapted for abutment with filler cell region 102, hence standard cell region 103(1) is a referred to as filler-adapted standard cell region 103(1). In some embodiments, macro 10A further includes an optional filler-adapted standard cell region 103(2) which is abutted with a second side of filler cell region 102. In some embodiments, the first direction is a direction other than the horizontal direction. In FIG. 1, relative to the horizontal direction, the first and second sides of filler cell region 102 correspondingly are the left and right sides.

Figures 2A, 2B, 2C:
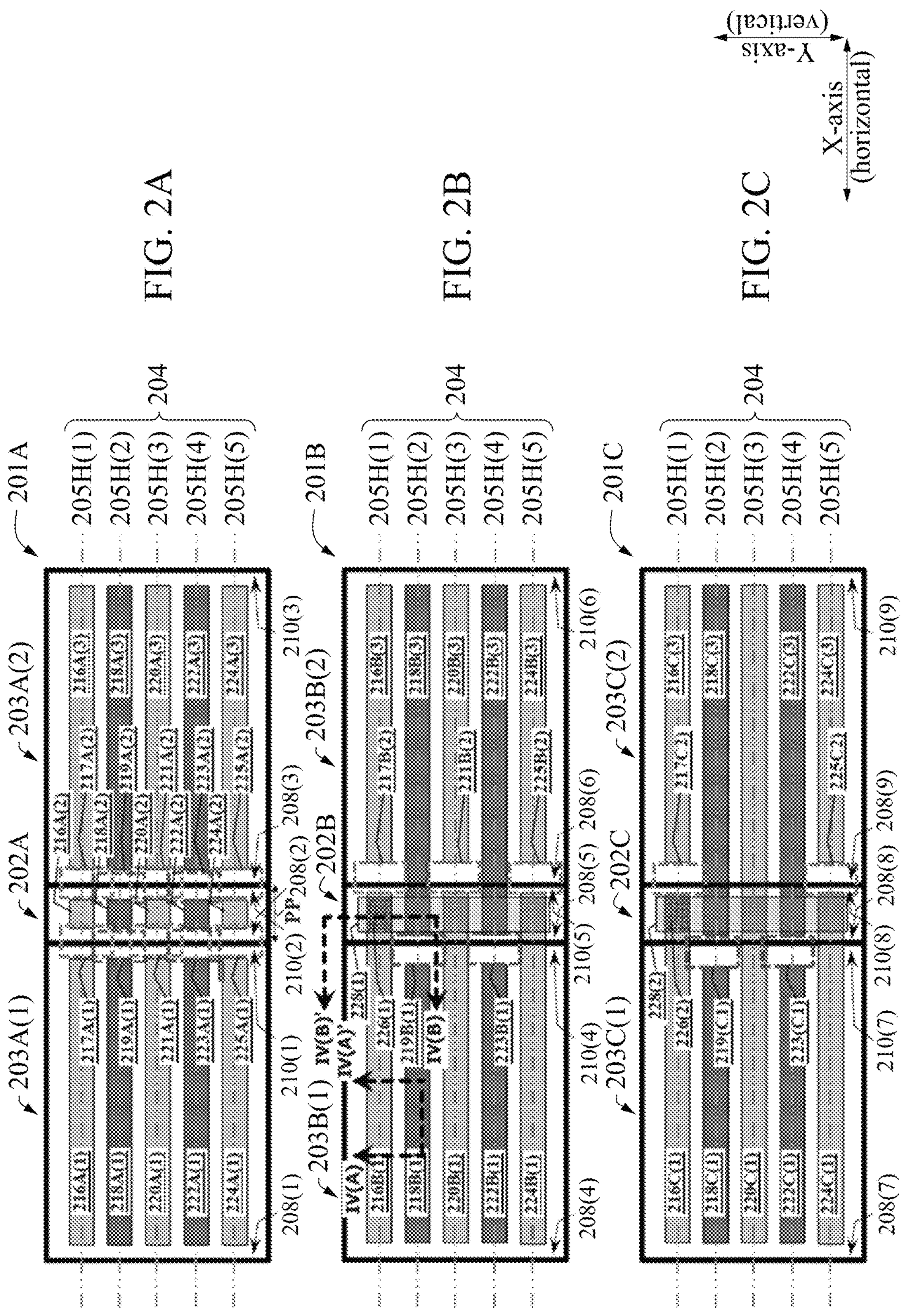

FIGS. 2A-2B are corresponding layout diagrams 201A-201B, in accordance with some embodiments.

More particularly, layout diagram 201A of FIG. 2A is an example starting point for applying the filler-cell-encroachment technique, and layout diagram 201B as well as layout diagrams 201C-201G are corresponding results of having applied the filler-cell-encroachment technique in accordance with some embodiments.

Layout diagram 201A includes a filler cell 202A and functional cells 203A(1) and 203A(2) in row 204. In some embodiments, the function of cells 203A(1) and/or 203A(2) is a Boolean logic function. In some embodiments, the function of cells 203A(1) and/or 203A(2) is a storage function. An example of a semiconductor device having been fabricated based on a larger layout diagram which includes layout diagram 201A is semiconductor device 100 of FIG. 1, where cell regions 103(1), 102 and 103(2) correspond to cells 203A(1), 202A and 203A(2).

Cells 203A(1), 202A and 203A(2) are arranged with respect to an imaginary grid. The grid includes routing tracks 205H(1), 205H(2), 205H(3), 205H(4) and 205H(5) which extend substantially in a first direction. In some embodiments, the first direction is the horizontal direction. In some embodiments, the first direction is the X-axis. Tracks 205H(1)-205H(5) have a first track pitch relative to the Y-axis, where the first track pitch is determined by the design rules and scale of the corresponding semiconductor process technology node. Left and right side boundaries (discussed below) of cells 203A(1), 202A and 203A(2) extend substantially in a second direction substantially perpendicular to the first direction. In some embodiments, the second direction is the vertical direction. In some embodiments, the second direction is the Y-axis. Cell 203A(1) has a perimeter which includes left side boundary 208(1) and right side boundary 210(1). Cell 202A has a perimeter which includes left side boundary 208(2) and right side boundary 210(2). Cell 203A(2) has a perimeter which includes left side boundary 208(3) and right side boundary 210(3). Right side boundary 210(1) of functional cell 203A(1) is substantially collinear with left side boundary 208(2) of filler cell 202A. Right side boundary 210(2) of filler cell 202A is substantially collinear with left side boundary 208(3) of functional cell 203A(2).

Functional cell 203A(1) includes rectangular wiring patterns 216A(1), 218A(1), 220A(1), 222A(1) and 224A(1), long axes of which extend substantially parallel to the X-axis. Filler cell 202A includes rectangular wiring patterns 216A(2) 218A(2), 220A(2), 222A(2) and 224A(2), long axes of which extend substantially parallel to the X-axis. Functional cell 203A(2) includes rectangular wiring patterns 216A(3), 218A(3), 220A(3), 222A(3) and 224A(3), long axes of which extend substantially parallel to the X-axis.

Long axes of wiring patterns 216A(1), 216A(2) and 216A(3) are substantially aligned with corresponding track 205H(1) and so are regarded as being substantially co-track. Long axes of wiring patterns 218A(1), 218A(2) and 218A(3) are substantially aligned with corresponding track 205H(2) and so are regarded as being substantially co-track. Long axes of wiring patterns 220A(1), 220A(2) and 220A(3) are substantially aligned with corresponding track 205H(3) and so are regarded as being substantially co-track. Long axes of wiring patterns 222A(1), 222A(2) and 222A(3) are substantially aligned with corresponding track 205H(4) and so are regarded as being substantially co-track. Long axes of wiring patterns 224A(1), 224A(2) and 224A(3) are substantially aligned with corresponding track 205H(5) and so are regarded as being substantially co-track.

Wiring patterns 216A(1)-216A(3), 218A(1)-218A(3), 220A(1)-220A(3), 222A(1)-222A(3) and 224A(1)-224A(3) are in a first level of metallization (M_1st level) in layout diagram 201A correspond to conductors included in a first layer of metallization (M_1st layer) in a semiconductor device having been fabricated based on a larger layout diagram which includes layout diagram 201A. In some embodiments, depending upon the numbering convention of the corresponding process node by which such a semiconductor device is fabricated, the first (1st) layer of metallization M_1st is either metallization layer zero, M0, or metallization layer one, M1, and correspondingly a first layer (V_1st) of interconnection (see FIGS. 2A-2G) is either VIA0 or VIA1. In FIGS. 2A-2B, as well as 2C-2G, M_1st is assumed to be M0 and V_1st is assumed to be VIA0 such that via pattern 226(1) in level VIA0 (see FIG. 2B) is referred to as V0 pattern 226(1). In some embodiments, M0 is the first layer of metallization above a transistor layer (see FIGS. 4A-4B, discussed below) in which transistors are formed.

It is assumed that the process node, by which is fabricated a semiconductor device based on a larger layout diagram which includes layout diagram 201A, uses multi-patterning, e.g., double-patterning, lithography. Accordingly, wiring patterns 216A(1)-216A(3), 220A(1)-220A(3) and 224A(1)-224A(3) are shown in the color green, whereas wiring patterns 218A(1)-218A(3) and 222A(1)222A(3) are shown in the color red.

Relative to the X-axis, widths of corresponding wiring patterns 216A(1)-216A(3), 218A(1)-218A(2), 220A(1)-220A(3), 222A(1)-222A(2) and 224A(1)-224A(3) is less than a width of corresponding cells 203A(1), 202A and 203A(2). Accordingly, the widths of corresponding wiring patterns 216A(1)-216A(3), 218A(1)-218A(2), 220A(1)-220A(3), 222A(1)-222A(2) and 224A(1)-224A(3) are described as intra-cell.

More particularly as to the example of FIG. 2A, absent some reason to the contrary, e.g., a routing conflict, a first design rule sets a default length of intra-cell wiring patterns (e.g., pattern 216A(1)) to a maximum intra-cell length in the horizontal direction so that a semiconductor device which has been fabricated based on the corresponding layout diagram (e.g., layout diagram 201A) exhibits correspondingly increased structural density. Such a semiconductor device can be planarized more quickly, e.g., because the increased structural density reduces irregularities in surface topography. In some embodiments, the maximum length (LMAX) is substantially equal to the difference between a width of the cell (LW) and twice the minimum boundary offset (LOFF) with respect to a left/right side boundary of a cell such that LMAX≈LW−2*LOFF. The minimum boundary offset LOFF is determined by the design rules and scale of the corresponding semiconductor process technology node.

Figure 4B:
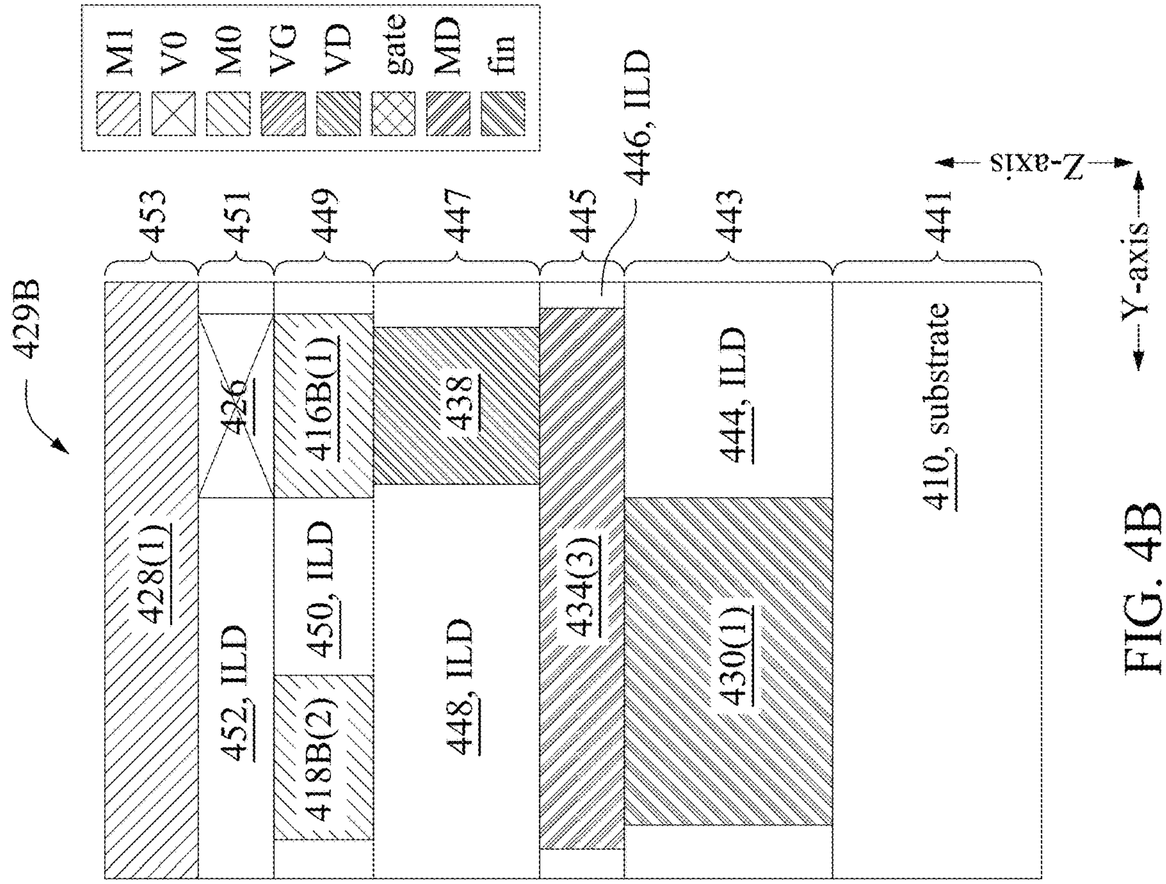
FIGS. 4A-4B are corresponding cross-sections of corresponding parts of a cell region of a semiconductor device, in accordance with some embodiments.
Figure 4A:
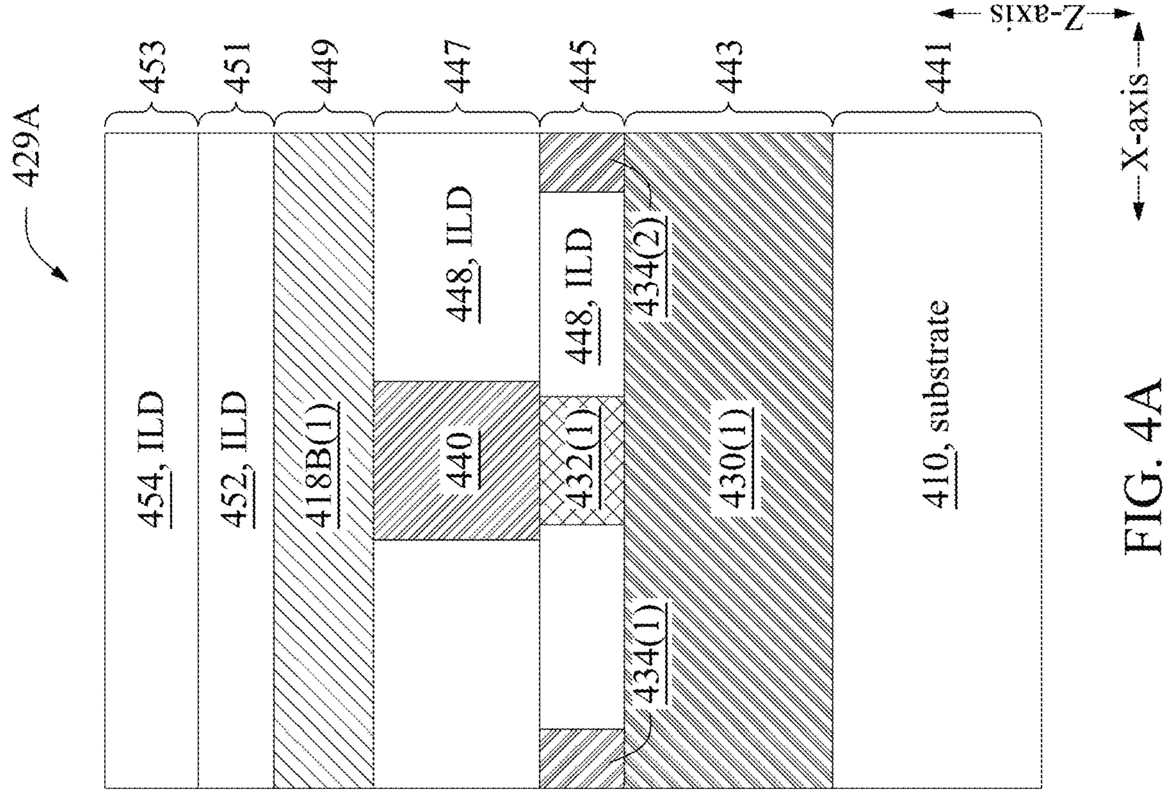

In some embodiments, each of cells 203A(1)-203A(2) includes patterns in a corresponding transistor level (not shown, but see FIGS. 4A-4B). In some embodiments, the transistor level of each of cells 203A(1)-203A(2) includes corresponding sub-levels (not shown). The sub-levels include component patterns (not shown) corresponding to components, e.g., transistors, of a circuit that would result from a larger layout diagram which includes layout diagram 201A.

In some embodiments, the transistor level of each of cells 203A(1)-203A(2) is designated for CMOS configuration such that a semiconductor device having been fabricated based on a layout diagram which includes cells 203A(1)-203A(2) would be a CMOS device. Where designated for CMOS configuration, each of cells 203A(1)-203A(2) is organized into a first area (not shown) designated for PMOS-configuration and a second area (not shown) designated for NMOS-configuration. Details regarding CMOS configuration and corresponding fabrication are found, e.g., in U.S. Pat. No. 8,786,019, granted Jul. 22, 2014, the entirety of each of which is hereby incorporated by reference. In some embodiments, the transistor level of each of cells 203A(1)-203A(2) is designated for PMOS configuration and not for CMOS configuration. In some embodiments, the transistor layer of each of cells 203A(1)-203A(2) is designated for NMOS configuration and not for CMOS configuration.

In some embodiments, FIG. 2A assumes additional M0 wiring patterns (not shown) which are power grid (PG) patterns that represent portions of longer corresponding power grid lines (not shown) of a semiconductor device which has been fabricated based on layout diagram 201A. In some embodiments, a first one of the PG patterns is designated for a first reference voltage and a second one of the PG patterns is designated for a second reference voltage. In some embodiments, the first reference voltage is VDD and the second reference voltage is VSS.

Where there are wiring patterns which are substantially co-track, a second design rule for the process node associated with the cell imposes (relative to the X-axis) a minimum gap (end-to-end gap) between ends of substantially co-track aligned wiring patterns. The minimum gap end-to-end gap is determined by the design rules and scale of the corresponding semiconductor process technology node. In some embodiments, the minimum gap is achieved using cut patterns. In general, where a subject pattern underlies a given cut pattern such that a portion of the subject pattern is overlapped by the given cut pattern, the given cut pattern is used to indicate that the overlapped portion of the subject pattern eventually will be removed during fabrication of a corresponding semiconductor device.

Cell 203A(1) includes a first group of cut patterns 217A(1), 219A(1), 221A(1), 223A(1) and 225A(1), and a second group of cut patterns 217A(2), 219A(2), 221A(2), 223A(2) and 225A(2). Relative to the X-axis, the first group of cut patterns overlaps right side boundary 210(1) of functional cell 203A(1) and left side boundary 208(2) of filler cell 202A. In some embodiments, long axes of cut patterns in the first group are substantially aligned with an axis of symmetry represented by the substantially collinear right side boundary 210(1) of functional cell 203A(1) and left side boundary 208(2) of filler cell 202A. Cell 203A(1) further includes a third group of cut patterns (not shown), where the long axes of the cut patterns in the third group are substantially aligned with an axis of symmetry substantially represented by left side boundary 208(1) of functional cell 203A(1). Relative to the X-axis, the second group of cut patterns overlaps right side boundary 210(2) of filler cell 202A and left side boundary 208(3) of functional cell 203A(2). In some embodiments, long axes of cut patterns in the first group are substantially aligned with an axis of symmetry represented by the substantially collinear right side boundary 210(2) of filler cell 202A and left side boundary 208(3) of functional cell 203A(2). Cell 203A(2) further includes a fourth group of cut patterns (not shown), where the long axes of the cut patterns in the fourth group are substantially aligned with an axis of symmetry substantially represented by right side boundary 210(3) of functional cell 203A(2).

The first group of cut patterns, which (again) corresponds to M0 wiring patterns 216A(1), 218A(1), 220A( ), 222A(1) and 224A(1), results in the minimum gap between corresponding M0 wiring patterns 216A(1) & 216A(2), 218A(1) & 218A(2), 220A(1) & 220A(2), 222A(1) & 222A(2) and 224A(1) & 224A(2). The second group of cut patterns, which (again) corresponds to M0 wiring patterns 216A(3), 218A(3), 220A(3), 222A(3) and 224A(3), which result in the minimum gap between corresponding M0 wiring patterns 216A(2) & 216A(3), 218A(2) & 218A(3), 220A(2) & 220A(3), 222A(2) & 222A(3) and 224A(2) & 224A(3). Another result of the first and second groups of cut patterns is that each of M0 wiring patterns 216A(2), 218A(2), 220A(2), 222A(2) and 224A(2) is intra-cell with respect to filler cell 202A.

In FIG. 2A, relative to the X-axis, filler cell 202A has a width of substantially one contacted poly pitch (CPP), and is alternately referred to as a filler-1 cell. As a unit of length measure, CPP is determined by the design rules and scale of the corresponding semiconductor process technology node. In some embodiments, filler cell 202A has a width substantially of at least two positive integer multiples of CPP. For example, if filler cell 202A had a width of substantially 8CPP, then filler cell 202A alternatively would be referred to as a filler-8 cell.

Turning to FIG. 2B, layout diagram 201B is similar to layout diagram 201A. FIG. 2B follows a similar numbering convention to that of FIG. 2A. Though corresponding, some components also differ. To help identify components which correspond but nevertheless have differences, the numbering convention uses an alphabetic character. For example, pattern 216B(1) in FIG. 2B and pattern 216A(1) in FIG. 2A are both wiring patterns, with similarities being reflected in the common root 216* and the common parenthetical **(1), and with the differences being reflected in the alphabetic characters*B(*) and ***A(*). For brevity, the discussion will focus more on differences between FIG. 2B and FIG. 2A than on similarities.

Cell 202B further includes a rectangular wiring pattern 228(1), and a via pattern 226(1). A long axis of wiring pattern 228(1) extends substantially parallel to the Y-axis. More particularly, the long axis of wiring pattern 228(1) is substantially aligned with a long axis of symmetry of filler cell 202A. Wiring pattern 228A corresponds to a conductor in a second layer of metallization, M_2nd, in the semiconductor device having been fabricated based on a larger layout diagram which includes layout diagram 201B. Via pattern 226(1) corresponds to a via structure in a the V_1st level of interconnect structures between the M_1st and M_2nd layers, in the semiconductor device having been fabricated based on a larger layout diagram which includes layout diagram 201B. In the example of FIG. 2B, because M_1st is assumed to be M0, the M_2nd level is assumed to be M1.

Via pattern 226(1) is located at the intersection of the long axis of symmetry of filler cell 202A and track 205H(1) so that via pattern 226(1) overlaps M0 wiring pattern 216B(1). In the example of FIG. 2B, it is assumed that via-based coupling is to be made between M1 wiring pattern 228(1) and M0 wiring pattern 216B(1) of functional cell 203A(1). In some embodiments, the via-based coupling between M1 wiring pattern 228(1) and functional cell 203A(1) is to be made by locating via pattern 226(1) at the intersection of the long axis of symmetry of filler cell 202A and track 205H(3)

so that via pattern 226(1) overlaps M0 wiring pattern 220B(1), or at the intersection with track 205H(5) so that via pattern 226(1) overlaps M0 wiring pattern 224B(1). In some embodiments, via pattern 226(1) is used instead to make a via-based coupling between M1 wiring pattern 228(1) and functional cell 203A(3) by locating via pattern 226(1) at the intersection of the long axis of symmetry of filler cell 202A and track 205H(2) so that via pattern 226(1) overlaps M0 wiring pattern 218B(3), or at the intersection with track 205H(4) so that via pattern 226(1) overlaps M0 wiring pattern 222B(3).

In layout diagram 201B, there are no cut patterns corresponding to cut patterns 217A(1), 221A(1) and 225A(1) of layout diagram 201A, which has an effect correspondingly of extending M0 wiring patterns 216B(1), 220B(1) and 224B(1) across side border 210(4) of cell 203B(1) into cell 202B, and of correspondingly eliminating M0 wiring patterns 216A(2), 220A(2) and 224A(2) of layout diagram 201A. By having extended/elongated M0 wiring patterns 216B(1), 220B(1) and 224B(1), alternatively M0 wiring patterns 216B(1), 220B(1) and 224B(1) are described as encroaching on filler cell 202A. Hence, the corresponding extension/elongation is referred to as a filler-cell-encroachment technique. Also, relative to the substantially collinear right side boundary 210(5) of filler cell 202B and left side boundary 208(6) of functional cell 203B(2), cut patterns 217B(2), 221B(2) and 225B(2) have been shifted to the right as compared to layout diagram 201A of FIG. 2A. Relative to functional cell 203A(1), M0 wiring patterns are substantially aligned with odd tracks, namely M0 wiring patterns 216B(1), 220B(1) and 224B(1) substantially aligned with corresponding tracks 205H(1), 205H(3) and 205H(5) have been extended/elongated by the shift to the right of corresponding cut patterns 217B(2), 221B(2) and 225B(2).

Similarly, in layout diagram 201B, there are no cut patterns corresponding to cut patterns 219A(2) and 223A(2) of layout diagram 201A, which has an effect correspondingly of extending M0 wiring patterns 218B(3) and 222B(3) across side border 208(6) of cell 203B(2) into cell 202B, and of correspondingly eliminating M0 wiring patterns 218A(2) and 222A(2) of layout diagram 201A. By having extended/elongated M0 wiring patterns 218B(3) and 222B(3), alternatively M0 wiring patterns 218B(3) and 222B(3) are described as encroaching on filler cell 202B. Hence, the corresponding extension/elongation is referred to as a filler-cell-encroachment technique. Also, relative to the substantially collinear right side boundary 210(4) of functional cell 203B(1) and left side boundary 208(5) of filler cell 202B, cut patterns 219B(1) and 223B(1) have been shifted to the left. Relative to functional cell 203A(2), M0 wiring patterns are substantially aligned with even tracks, namely M0 wiring patterns 218B(3) and 222B(3) substantially aligned with corresponding tracks 205H(2) and 205H(4) have been extended/elongated by the shift to the left of corresponding cut patterns 219B(1) and 223B(1).

In some embodiments, regarding filler cells that have a width of one contacted poly pitch (CPP) (filler-1 cells), e.g., filler cell 202B, the filler-cell-encroachment technique achieves a reduction in area of about 2.5% for a typical corresponding layout diagram. In some embodiments, regarding filler cells that have a width of one contacted poly pitch (CPP) (filler-1 cells), e.g., filler cell 202B, the filler-cell-encroachment technique achieves a reduction in total wire length in a range from about 2.0% to about 3.0% for a typical corresponding layout diagram.

In FIG. 2B, relative to the X-axis, the right ends of corresponding M0 wiring patterns 216B(1), 218B(1), 220B(1), 222B(1) and 224B(1) define a first profile, and the left ends of corresponding M0 wiring patterns 261B(3), 218B(3), 220B(3), 222B(3) and 224B(3) define a second profile. In the example of FIG. 2B, the first profile is a substantially complementary shape with respect to the second profile, and vice-versa.

FIGS. 2C-2G are corresponding layout diagrams 201C-201F, in accordance with some embodiments.

More particularly, layout diagrams 201C-201G are corresponding results of having applied the filler-cell-encroachment technique to layout diagram 201A of FIG. 2A, in accordance with some embodiments.

Layout diagrams 201C-201G follow a numbering convention similar to that of layout diagrams 201A-201B.

Regarding FIG. 2C, there is no cut pattern in layout diagram 201C corresponding to cut pattern 221A(2) of layout diagram 201A of FIG. 2A, the latter also corresponding to cut pattern 221B(2) of layout diagram 201B of FIG. 2B, which has an effect of extending M0 wiring pattern 220C(1) across side border 210(7) of cell 203C(1) into filler cell 202C and further across side borders 210(8) and 208(8) into functional cell 203C(2), and of correspondingly eliminating M0 wiring patterns 220A(2) and 220A(3) of layout diagram 201A. In some embodiments, one or more of cut patterns 219C(1), 223C(1) or 225C(2) are not included in layout diagram 201C.

Regarding FIG. 2D, there are no cut patterns in layout diagram 201D corresponding to cut patterns 217A(1), 219A(1), 221A(1), 223A(1) and 225A(1) of layout diagram 201A, which has an effect correspondingly of extending M0 wiring patterns 216D(1), 218D(1), 220D(1), 222D(1) and 224D(1) across side border 210(10) of cell 203D(1) into cell 22D, and of correspondingly eliminating M0 wiring patterns 216A(2), 218A(2), 220A(2), 222A(2) and 224A(2) of layout diagram 201A. Also, relative to the substantially collinear right side boundary 210(11) of filler cell 202D and left side boundary 208(12) of functional cell 203D(2), cut patterns 217D(2), 219D(2), 221D(2), 223D(2) and 225D(2) have been shifted to the right as compared to layout diagram 201A of FIG. 2A. In some embodiments, there are no cut patterns in layout diagram 201D corresponding to cut patterns 217A(2), 219A(2), 221A(2), 223A(2) and 225A(2) of layout diagram 201A such that, relative to the substantially collinear right side boundary 210(11) of filler cell 202D and left side boundary 208(12) of functional cell 203D(2), cut patterns 217D(1), 219D(1), 221D(1), 223D(1) and 225D(1) would appear to have been shifted to the right as compared to layout diagram 201A of FIG. 2A.

Regarding FIG. 2E, there is no cut pattern in layout diagram 201E corresponding to cut pattern 217A(2) of layout diagram 201A of FIG. 2A, the latter also corresponding to cut pattern 217D(2) of layout diagram 201D of FIG. 2D, which has an effect of extending M0 wiring pattern 216E(1) across side border 210(13) of cell 203E(1) into filler cell 202E and further across side borders 210(14) and 208(14) into functional cell 203E(2), and of correspondingly eliminating M0 wiring patterns 220A(2) and 220A(3) of layout diagram 201A. In some embodiments, one or more of cut patterns 219D(1), 223D(1) or 225D(2) are not included in layout diagram 201E.

Figure 2G:
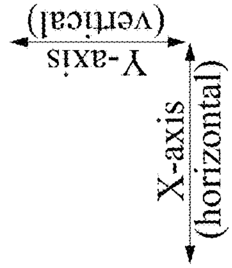
Figure 2G:
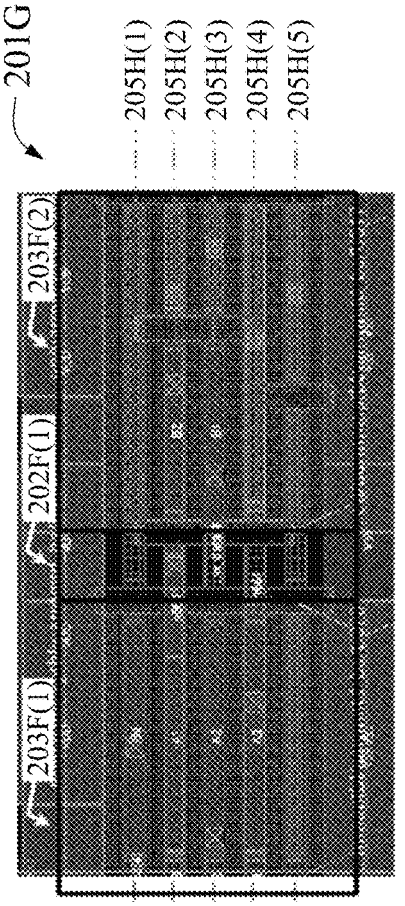
Figure 2F:
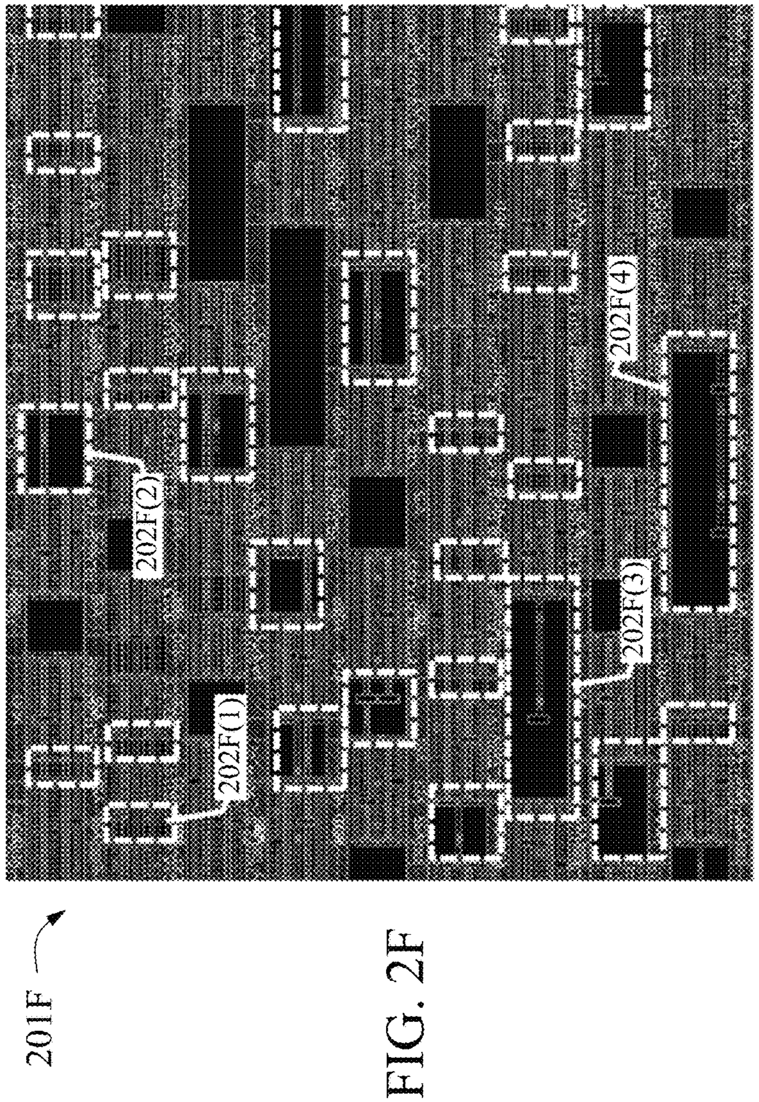

Regarding FIG. 2F, layout diagram 201F is of a larger scope than layout diagrams 201A-201E of corresponding FIGS. 2A-2E. As such, layout diagram includes instances (not numbered) of row 204. Furthermore, each instance of row 204 in layout diagram 201F includes multiple circumstances in which a filler cell is abutted to the left and to the right by corresponding functional cells. In layout diagrams, there are filler cells of multiple widths. As examples, filler cell 202F(1) is a filler-1 cell having a width of substantially CPP, filler cell 202F(2) is a filler-2 cell having a width substantially of 2CPP, filler cell 202F(3) is a filler-8 cell having a width substantially of 8CPP, and filler cell 202F(4) is a filler cell having a width substantially of 10CPP.

Regarding FIG. 2G, layout diagram 201G is an exploded view of the portion of the row in layout diagram 201F in which filler cell 202F(1) is located. Relative to filler cell 202F(1), layout diagram 201G includes left-abutting functional cell 203F(1) and right-abutting functional cell 203F(2).

Figure 3A:
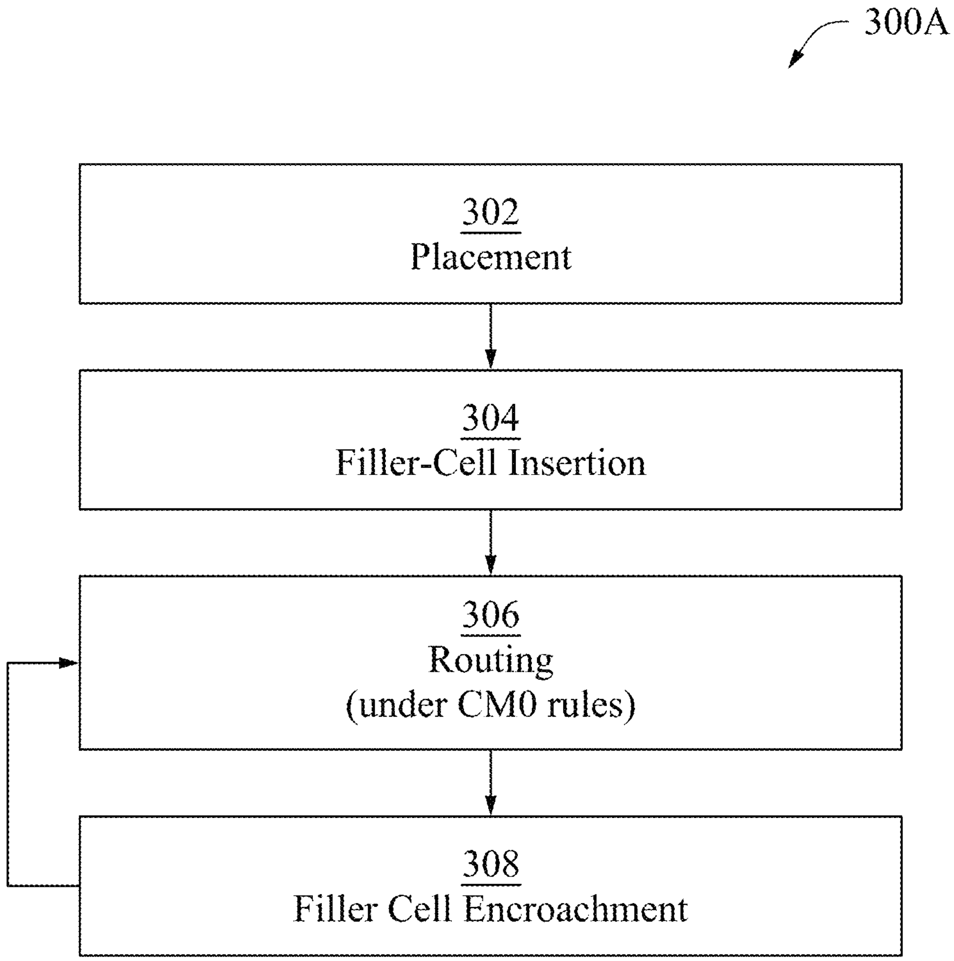
FIG. 3A is a flowchart, in accordance with some embodiments.

FIG. 3A is a flowchart of a method 300A, in accordance with some embodiments.

Method 300A is a method of generating a layout diagram. Method 300A includes blocks 302-308. Blocks 302-308 correspond to block 502 of FIG. 5. In block 308, the filler-cell-encroachment technique is applied to the layout diagram. Block 308 is described in more detail with respect to the flowcharts of FIGS. 6A-6C.

In block 302, cells are placed into corresponding rows in a layout diagram. From block 302, flow proceeds to block 304. At block 304, filler cells are added/insert to the layout diagram to reduce empty space in the corresponding rows. From block 304, flow proceeds to block 306. At block 306, M0 level routing is performed. In some embodiments, a design rule related to minimum permissible spacing/separation, e.g., in the direction of the X-axis, between cut-M0 (CM0) patterns is taken into consideration. undertaken. From block 306, flow proceeds to block 308. At block 308, the filler-cell encroachment technique is performed to improve routability. In some embodiments, the filler-cell encroachment technique is performed to avoid violations of the design rule regarding minimum CM0 spacing/separation. From block 308, flow loops back to block 306.

FIGS. 3B-3E are corresponding graphs 300B-300E showing improvements, in accordance with some embodiments.

Figure 3B:
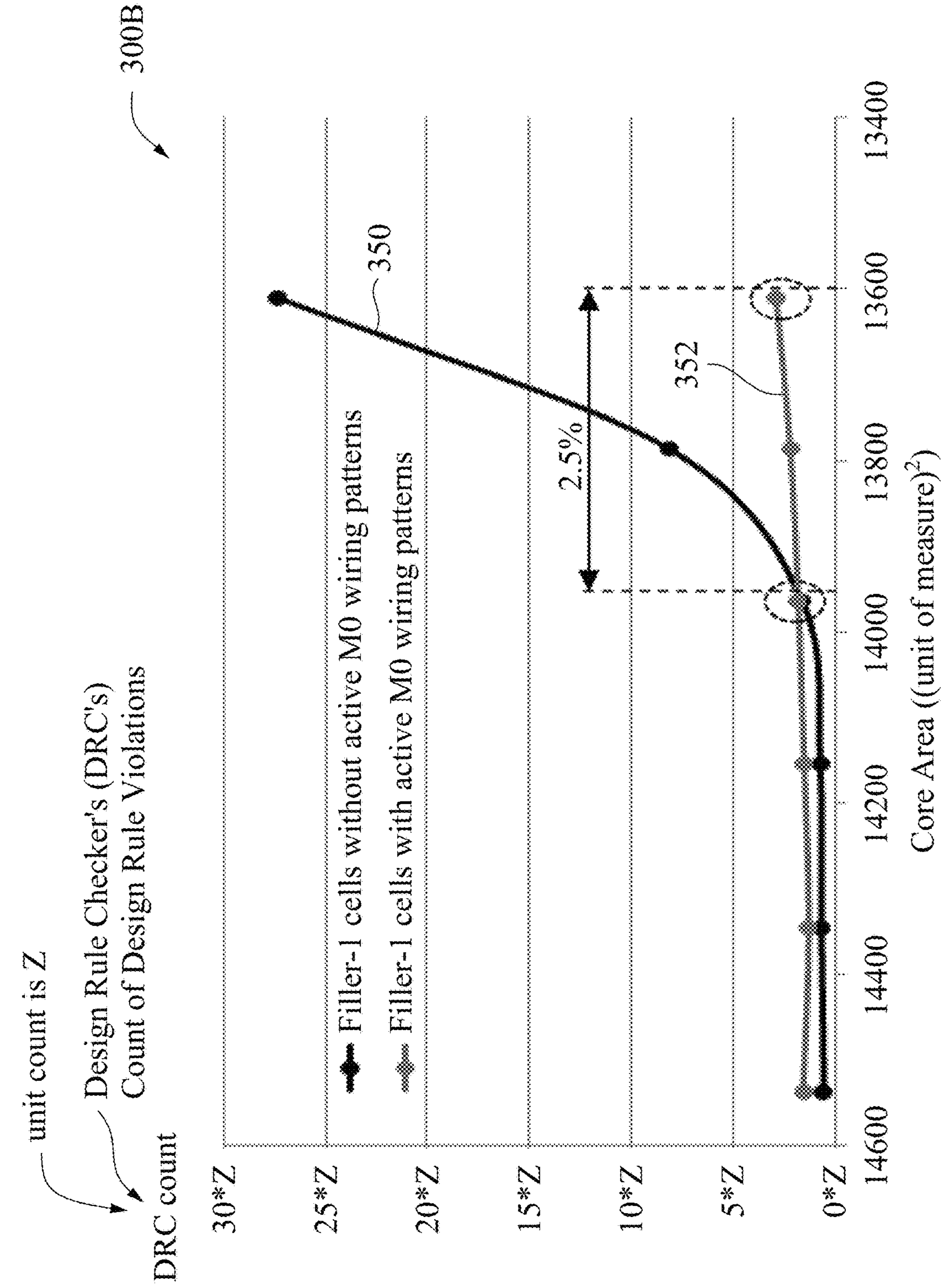
FIGS. 3B-3E are corresponding graphs showing improvements, in accordance with some embodiments.

In FIG. 3B, graph 300B shows plots 350 and 352 of area (X-axis) versus count of design rule checker (DRC) violations regarding M0 routing for filler-1 cells operating at a speed of about 1x, where x is a unit of speed measurement. Plot 350 represents layout diagrams generated according to another approach, where such layout diagrams including filler-1 cells without encroachment of elongated M0 wiring patterns from abutting functional cells. Plot 352 represents layout diagrams generated according to one or more embodiments, where such layout diagrams including filler-1 cells into which elongated M0 wiring patterns encroach from one or more abutting functional cells according to the filler-cell-encroachment technique. Plot 352 shows a reduction in area of about 2.5%, and a reduction in DRC violation counts, resulting from the filler-cell-encroachment technique.

Figure 3C:
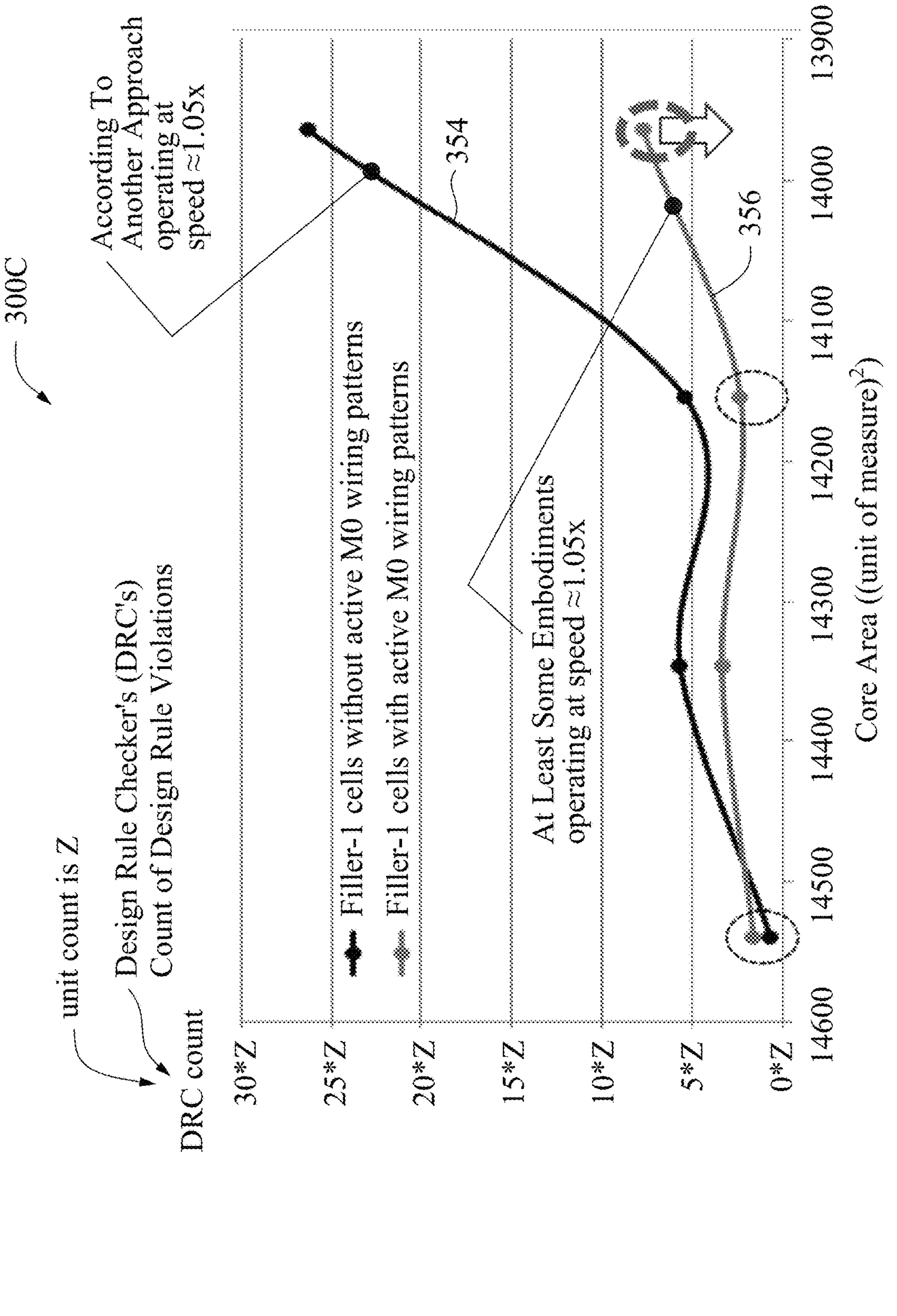

In FIG. 3C, graph 300C shows plots 354 and 356 of area (X-axis) versus count of design rule checker (DRC) violations regarding M0 routing for filler-1 cells operating at a speed of about 1.05x, where x is a unit of speed measurement. Plot 354 represents layout diagrams generated according to another approach, where such layout diagrams including filler-1 cells without encroachment of elongated M0 wiring patterns from abutting functional cells. Plot 356 represents layout diagrams generated according to one or more embodiments, where such layout diagrams including filler-1 cells into which elongated M0 wiring patterns encroach from one or more abutting functional cells according to the filler-cell-encroachment technique. Plot 356 shows improvements similar to the improvements shown by plot 352 of FIG. 3B.

Figure 3D:
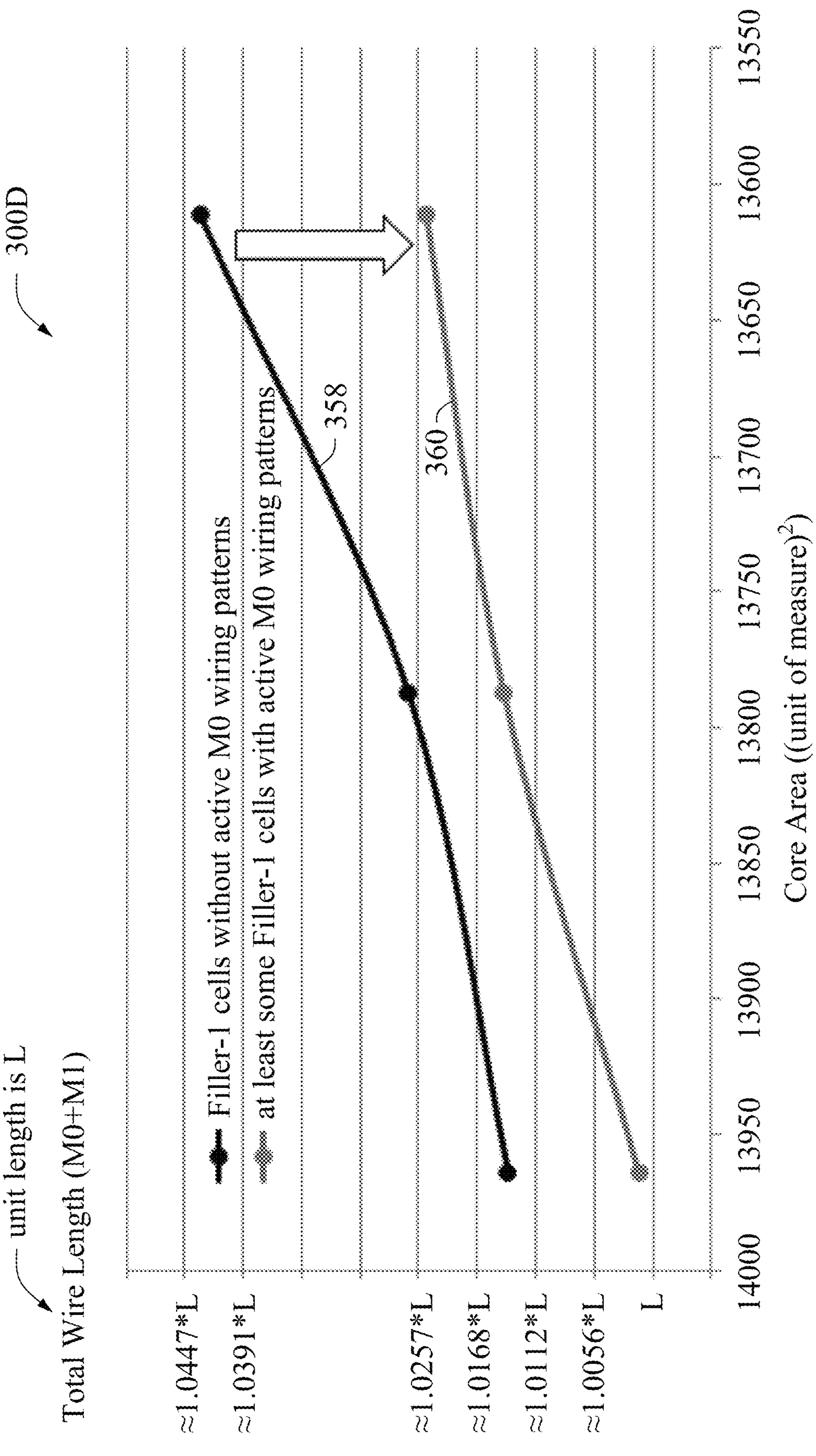

In FIG. 3D, graph 300F shows plots 358 and 360 of area (X-axis) versus total wire length for levels M0 and M1 for filler-1 cells. Plot 358 represents layout diagrams generated according to another approach, where such layout diagrams including filler-1 cells without encroachment of elongated M0 wiring patterns from abutting functional cells. Plot 360 represents layout diagrams generated according to one or more embodiments, where such layout diagrams including filler-1 cells into which elongated M0 wiring patterns encroach from one or more abutting functional cells according to the filler-cell-encroachment technique. Plot 360 shows a reduction in wire length in a range from about 2.0% to about 3.0% resulting from the filler-cell-encroachment technique.

Figure 3E:
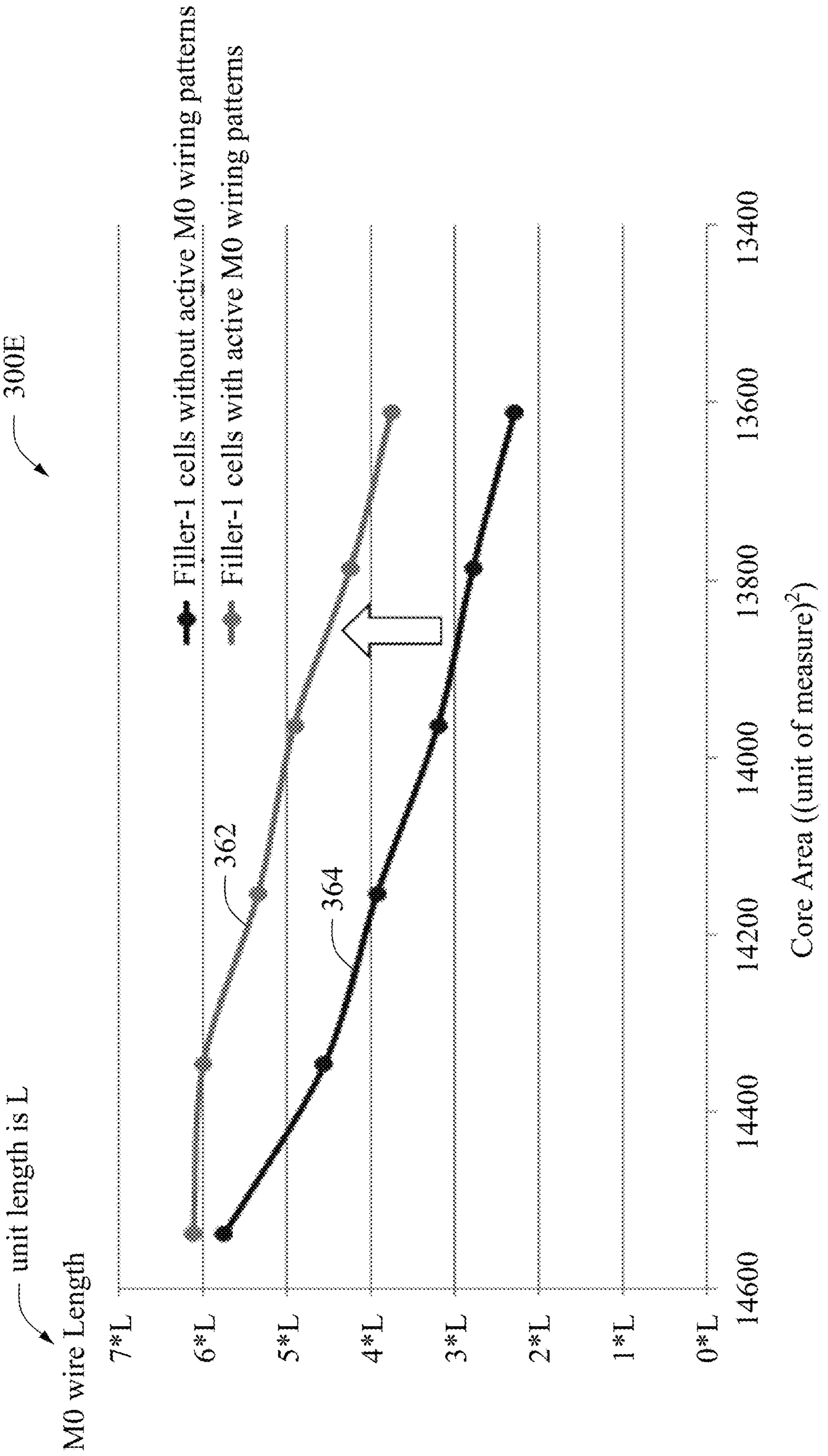

In FIG. 3E, graph 300G shows plots 362 and 364 of area (X-axis) versus total wire length for level M0 for filler-1 cells. Plot 362 represents layout diagrams generated according to another approach, where such layout diagrams including filler-1 cells without encroachment of elongated M0 wiring patterns from abutting functional cells. Plot 364 represents layout diagrams generated according to one or more embodiments, where such layout diagrams including filler-1 cells into which elongated M0 wiring patterns encroach from one or more abutting functional cells according to the filler-cell-encroachment technique. Plot 364 shows an increase in wire length at the M0 level by a factor of about 1.7 resulting from the filler-cell-encroachment technique, which reflects an increase in the routability of level M0.

FIGS. 4A-4B are corresponding cross-sections of corresponding parts of a cell region of a semiconductor device, in accordance with some embodiments.

FIGS. 4A-4B are corresponding cross-sections 429A and 429B of corresponding parts of a cell region of a semiconductor device, in accordance with some embodiments.

Cross-sections 429A-429B are corresponding parts of a cell region of a semiconductor device which is fabricated based on a larger layout diagram which includes a smaller layout diagram such as the layout diagrams disclosed herein, e.g., layout diagram 201B of FIG. 2B, which includes cell 202B. As such, cross-sections 429A-429B are examples of parts of corresponding cell regions 103(1) and 102 of semiconductor device 100 of FIG. 1.

Cross-sections 429A-429B follow a similar numbering scheme to that of layout diagram (1)201B of FIG. 2B. Though corresponding, some components also differ. To help identify components which correspond but nevertheless have differences, the numbering convention uses 4-series numbers for cross-sections 429A-429B while layout diagram 201B uses 2-series numbers. For example, M0 segment 418B(2) in FIG. 4B corresponds to M0 wiring pattern 218B(2) in FIG. 2B, with similarities being reflected in the common root *18(*) and the common parenthetical **(2), and with the differences being reflected in the corresponding leading digit (*) and 2**(*). For brevity, the discussion will focus more on differences between FIGS. 4A-4B and FIG. 2B than on similarities.

In FIGS. 4A-4B, each of cross-sections 429A-429B includes layers 441, 443, 445, 447, 449, 451 and 453. Layer 443 is formed on layer 441. Layer 445 is formed on layer 443. Layer 447 is formed on layer 445. Layer 449 is formed on layer 447. Layer 451 is formed on layer 449. Layer 453 is formed on layer 451.

Layer 441 is a substrate layer. Together, layers 443, 445 and 447 represent a transistor layer in which transistors are formed. Layer 443 is an active area layer. Layer 445 is a MG/GATE layer. Layer 447 is a VD/VG layer.

In cross-sections 429A-429B, layer 449 represents a first layer of metallization, M_1st, in a semiconductor device having been fabricated based on a larger layout diagram which includes a smaller layout diagram, e.g., layout diagram 201B of FIG. 2B. For consistency with layout diagram 201B, the M_1st layer is M0. Layer 451 represents an interconnect layer inserted between layer M0 449 and layer M1 453 of metallization.

Regarding layer 443 in FIG. 4A, cross-section 429A includes fin 430(1). Regarding layer 443 in FIG. 4B, cross-section 429B includes fin 430(1) and an interlayer dielectric (ILD) 444. In FIGS. 4A-4B, fin 430(1) represents an active area structure configured according to finFET transistor technology. In some embodiments, the active area structure is configured according to nano-wire. In some embodiments, the active area is configured according to nano-sheet transistor technology. In some embodiments, the active area is configured according to Gate-All-Around (GAA) transistor technology. In some embodiments, the active area is configured according to planar transistor technology.

Regarding layer 445 in FIG. 4A, cross-section 429A includes MD segments 434(1) and 434(2), and gate segment 432(1). Regarding layer 445 in FIG. 4B, cross-section 429B includes MD segment 434(3) and ILD 446. An MD structure, e.g., 434(3), is a contact structure which electrically couples an underlying source/drain region of a transistor (not shown), e.g., the corresponding underlying portion of fin 430(1), with a corresponding VD structure, e.g., 438.

Regarding layer 447 in FIG. 4A, cross-section 429A includes a VG structure 440 and ILD 448. A VG structure, e.g., 440, is a contact structure which electrically couples an underlying gate structure, e.g., 432(1), of a transistor (not shown) with a corresponding M0 conductive segment, e.g., 418B(1). Regarding layer 447 in FIG. 4B, cross-section 429B includes VD structure 438 and ILD 448. A VDG structure, e.g., 438, is a contact structure which electrically couples an underlying MD structure, e.g., 434(3), with a corresponding M0 conductive segment, e.g., 416B(1). In FIG. 4B, taken together, MD structure 434(3) and VD structure 438 represent a combination conductive structure which electrically couples an M0 conductive segment, e.g., 416B(1), with an underlying source/drain region, e.g., the corresponding underlying portion of fin 430(1).

Regarding layer 449 in FIG. 4A, cross-section 429A includes M0 conductive segment 418B(1). Regarding layer 449 in FIG. 4B, cross-section 429B includes M0 conductive segments 418B(2) and 416B(1) and ILD 450.

Regarding layer 451 in FIG. 4A, cross-section 429A includes ILD 452. Regarding layer 451 in FIG. 4B, cross-section 429B includes V0 structure 426 and ILD 452.

Regarding layer 453 in FIG. 4A, cross-section 429A includes ILD 454. Regarding layer 453 in FIG. 4B, cross-section 429B includes M1 conductive segment 428(1).

According to another approach, substantially all filler cells region do not include active devices, e.g., transistors. According to another approach, substantially no filler cell region includes a combination of an MD structure and a VD structure which electrically couples an M0 conductive segment with an underlying source/drain region, e.g., the corresponding underlying portion of a fin. According to another approach, substantially no filler cell region includes a VG structure which electrically couples an underlying gate structure of a transistor with a corresponding M0 conductive segment. According to another approach, substantially no filler cell region includes a filler-cell-region-encroaching M0 conductive segment which represents an extension/elongation of an M0 conductive segment from an abutting functional cell region into the filler cell region. According to another approach, substantially no filler cell region includes a V0 structure which overlies an area occupied by the filler cell region, and which couples a filler-cell-region-encroaching M0 conductive segment to a corresponding M1 conductive segment.

By contrast, in accordance with some embodiments, as a result of the filler-cell-encroachment technique, at least about 25% of the filler cell regions include at least one corresponding filler-cell-region-encroaching M0 conductive segment and at least one corresponding V0 structure which overlies an area occupied by the filler cell region. In accordance with some embodiments, as a result of the filler-cell-encroachment technique, at least about 50% of the filler cell regions include at least one corresponding filler-cell-region-encroaching M0 conductive segment and at least one corresponding V0 structure which overlies an area occupied by the filler cell region. In accordance with some embodiments, as a result of the filler-cell-encroachment technique, at least a majority of the filler cell regions include at least one corresponding filler-cell-region-encroaching M0 conductive segment and at least one corresponding V0 structure which overlies an area occupied by the filler cell region. In accordance with some embodiments, as a result of the filler-cell-encroachment technique, at least about 75% of the filler cell regions include at least one corresponding filler-cell-region-encroaching M0 conductive segment and at least one corresponding V0 structure which overlies an area occupied by the filler cell region. In accordance with some embodiments, as a result of the filler-cell-encroachment technique, pin access at the M0 layer is improved.

Figure 5:
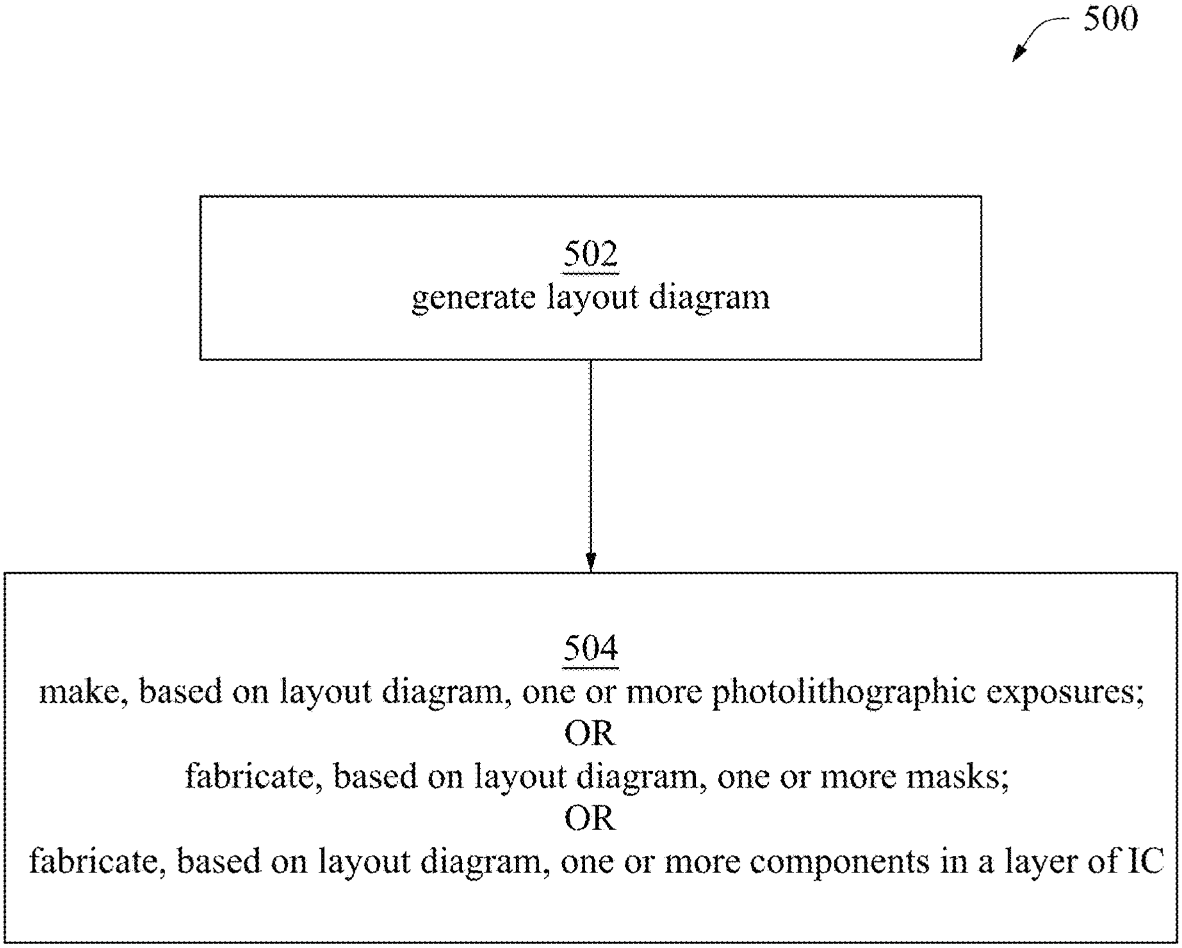
FIG. 5 is a flowchart of a method of generating a layout diagram, in accordance with some embodiments.

FIG. 5 is a flowchart of a method 500 of generating a layout diagram, in accordance with some embodiments.

Method 500 is implementable, for example, using EDA system 700 (FIG. 7, discussed below) and an integrated circuit (IC), manufacturing system 800 (FIG. 8, discussed below), in accordance with some embodiments. Regarding method 500, examples of the layout diagram include layout diagrams 201A-201G of corresponding FIGS. 2A-2G. Examples of a semiconductor device which can be manufactured according to method 500 include semiconductor device 100A of FIG. 1.

In FIG. 5, method 500 includes blocks 502-504. At block 502, a layout diagram is generated which, among other things, has at least a majority of the pin patterns concentrated in the M_1st level, which has benefits including one or more of improving routability at least by decreasing a number of wiring patterns in the M_2nd level which are designated as pin patterns, or improving flexibility at least by increasing by a number of points/locations at which connections potentially could be made (access points) to M_1st pin patterns, or the like. An example of a semiconductor device corresponding to a layout generated by method 500 includes semiconductor device 100 of FIG. 1. Block 502 is discussed in more detail below with respect to FIG. 6A. From block 502, flow proceeds to block 504.

At block 504, based on the layout diagram, at least one of (A) one or more photolithographic exposures are made or (B) one or more semiconductor masks are fabricated or (C) one or more components in a layer of a semiconductor device are fabricated. See discussion below of FIG. 8.

Figure 6B:
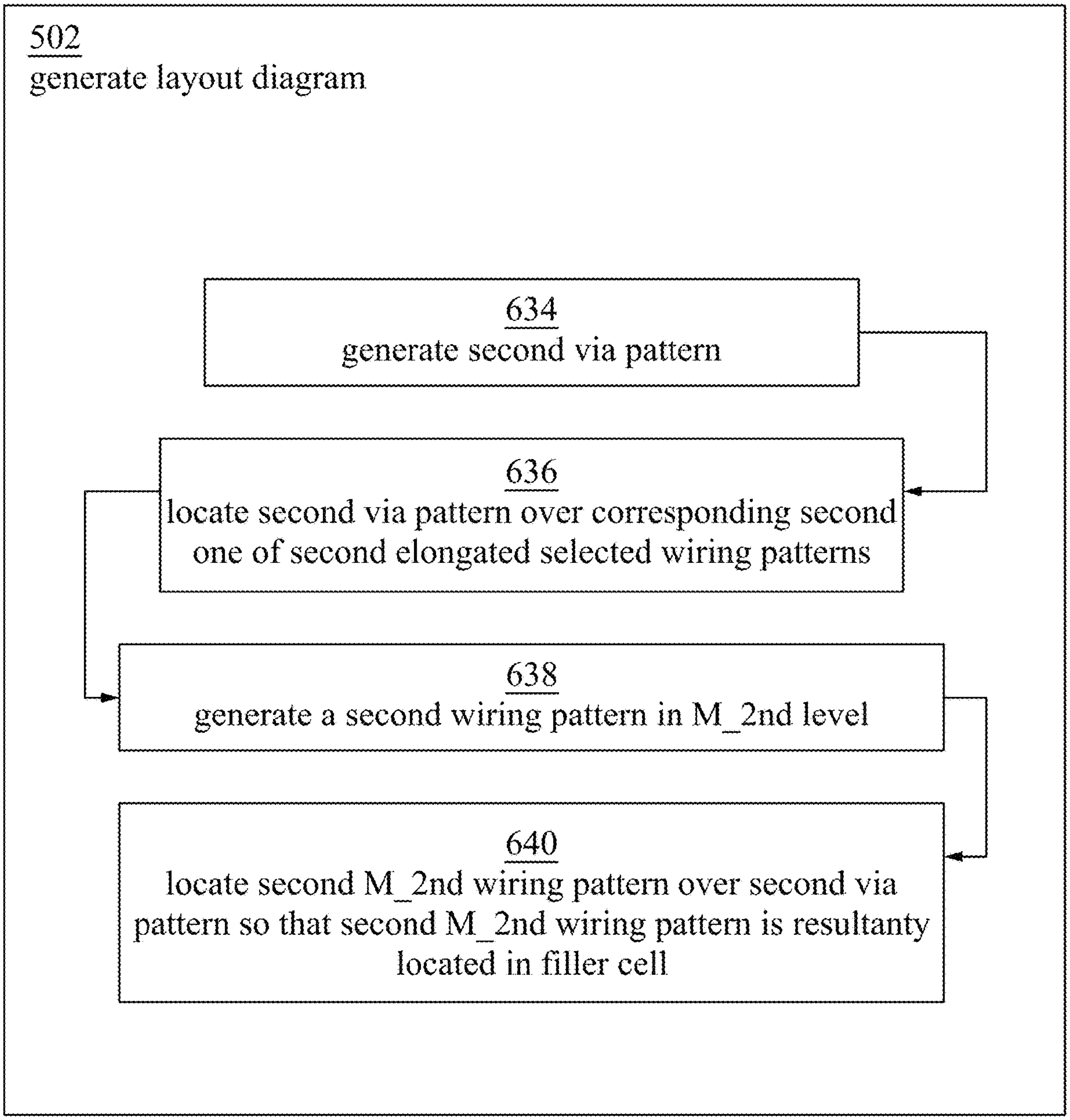
Figure 6C:
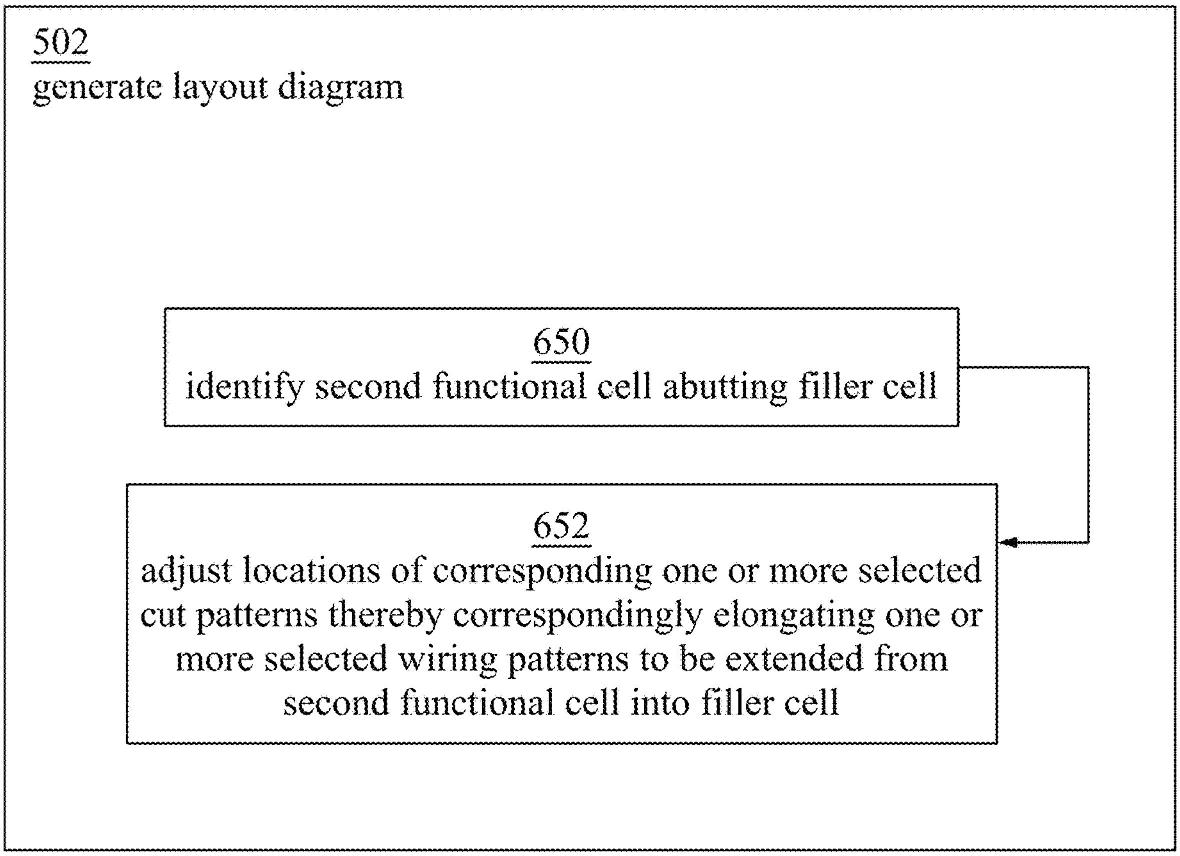

FIGS. 6A-6C are corresponding flowcharts of a method of generating a layout diagram, in accordance with some embodiments.

More particularly, the flowcharts of corresponding FIGS. 6A-6C shows additional blocks included in block 502 of FIG. 5, in accordance with one or more embodiments.

Block 502 is implementable, for example, using EDA system 700 (FIG. 7, discussed below), in accordance with some embodiments. Regarding block 502, examples of the layout diagrams which generated according to block 502 include layout diagrams 201B-201G, or the like. Examples of a semiconductor device which can be manufactured based on layout diagrams generated according to block 502 include semiconductor device 100A of FIG. 1, and semiconductor devices based on layout diagrams 201B-201B, or the like.

In FIG. 6A, block 502 includes blocks 620-630. At block 620, a filler cell and an abutting first functional cell are identified in the layout diagram. An example of the filler cell is filler cell 202A in FIG. 2A. Examples of an abutting first functional cell include functional cells 203A(1) or 203A(2) of FIG. 2A. From block 620, flow proceeds to block 622.

At block 622, locations of corresponding one or more selected cut patterns are adjusted thereby correspondingly elongating one or more selected M_1st wiring patterns so as to be extended from the first functional cell into the filler cell. Examples of the selected M_1st wiring patterns are M0 wiring patterns 216B(1), 220B(1) and 224B(1) of functional cell 203B(1) in FIG. 2B, and M0 wiring patterns 218A(2) and 222A(2) of functional cell 203A(2) in FIG. 2A. Examples of the elongation/extension of the selected wiring patterns are corresponding M0 wiring patterns 216B(1), 220B(1) and 224B(1) of functional cell 203A(1) in FIG. 2B, and M0 wiring patterns 218B(3) and 222B(3) of functional cell 203B(2) in FIG. 2B. From block 622, flow proceeds to block 624.

At block 624, a first via pattern is generated. An example of the first via pattern is via pattern 226(1) in FIG. 2B. From block 624, flow proceeds to block 626.

At block 626, the first via pattern is located over a corresponding first one of the elongated wiring patterns. An example of such location of the first via pattern is the location of via pattern 226(1) at the intersection of the long axis of symmetry of filler cell 202A and track 205H(1) so that via pattern 226(1) overlaps M0 wiring pattern 216B(1). From block 626, flow proceeds to block 628.

At block 628, a wiring pattern in the M_2nd level is generated. An example of the wiring pattern in the M_2nd level is M1 wiring pattern 228(1) in FIG. 2B. From block 628, flow proceeds to block 630.

At block 630, the M_2nd wiring pattern is located over the first via pattern so that the M_2nd wiring pattern is resultantly located in the filler cell. An example of the location of the M_2nd wiring pattern over the via pattern and resultantly over the filler via pattern is M1 pattern 228(1), which is located over via pattern 226(1) such resultantly the long axis of M1 wiring pattern 228(1) is substantially aligned with a long axis of symmetry of filler cell 202A.

In FIG. 6B, block 502 further includes blocks 634-640.

At block 634, a second via pattern is generated. An example of the second via pattern is found in one or more filler cells in FIG. 2F. Block 634 assumes a circumstance in which the filler cell has a width substantially of at least two positive integer multiples of CPP. Examples of such filler cells are found in FIG. 2F. From block 634, flow proceeds to block 636.

At block 636, the second via pattern is located over a corresponding second one of the elongated wiring patterns. An example of such location of the second via pattern is found in one or more filler cells in FIG. 2F. From block 636, flow proceeds to block 638.

At block 638, a second wiring pattern in the M_2nd level is generated. An example of the second wiring pattern in the M_2nd level is found in one or more filler cells in FIG. 2F. From block 638, flow proceeds to block 640.

At block 640, the second M_2nd wiring pattern is located over the second via pattern so that the second M_2nd wiring pattern is resultantly located in the filler cell. An example of the location of the second M_2nd wiring pattern over the second via pattern and resultantly over the filler via pattern is found in one or more filler cells in FIG. 2F.

In FIG. 6C, block 502 further includes blocks 650-652. At block 650, a second functional cell, which abuts the filler cell, is identified in the layout diagram. Assuming that that an example of the first functional cell is functional cell 203A(1) of FIG. 2A, then an example of an abutting second functional cell 203A(2) of FIG. 2A. From block 650, flow proceeds to block 652.

At block 652, locations of corresponding one or more selected cut patterns are adjusted thereby correspondingly elongating one or more selected M_1st wiring patterns so as to be extended from the second functional cell into the filler cell. Assuming that that an example of the first functional cell is functional cell 203A(1) of FIG. 2A, then an examples of the selected M_1st wiring patterns are M0 wiring patterns 218A(3) and 222A(3) of functional cell 203A(2) in FIG. 2A. Examples of the elongation/extension of the selected wiring patterns are corresponding M0 wiring patterns 218B(3) and 222B(3) of functional cell 203B(2) in FIG. 2B.

Figure 7:
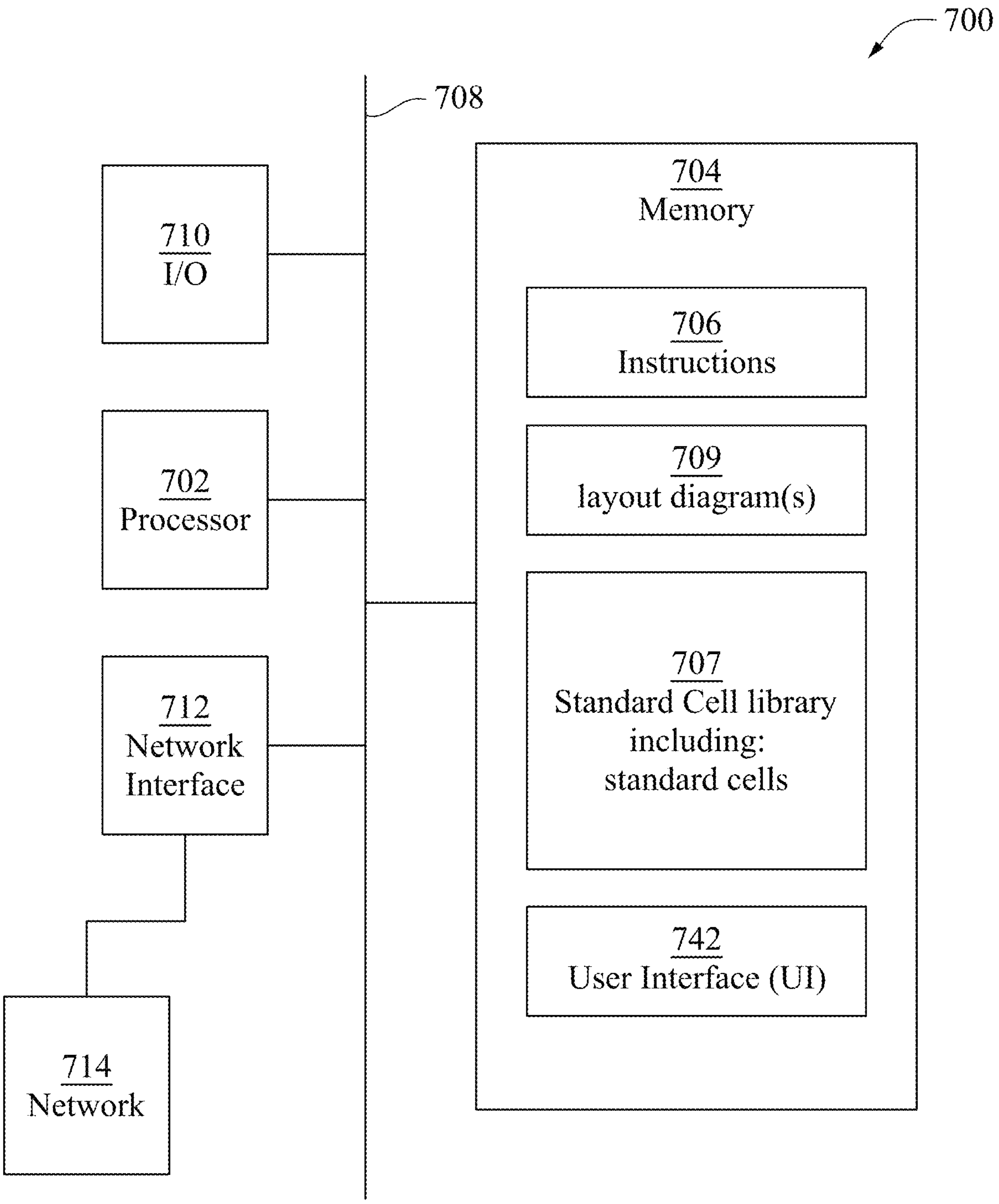
FIG. 7 is a block diagram of an electronic design automation (EDA) system in accordance with some embodiments.

FIG. 7 is a block diagram of an electronic design automation (EDA) EDA system 700 in accordance with some embodiments.

In some embodiments, EDA system 700 includes an APR system. Methods described herein of designing layout diagrams represent wire routing arrangements, in accordance with one or more embodiments, are implementable, for example, using EDA system 700, in accordance with some embodiments.

In some embodiments, EDA system 700 is a general purpose computing device including a hardware processor 702 and a non-transitory, computer-readable storage medium 704. Storage medium 704, amongst other things, is encoded with, i.e., stores, computer program code 706, where computer program code 706 is a set of computer-executable instructions. Execution of computer program code 706 by processor 702 represents (at least in part) an EDA tool which implements a portion or all of, e.g., the methods described herein in accordance with one or more corresponding embodiments (hereinafter, the noted processes and/or methods).

Processor 702 is electrically coupled to computer-readable storage medium 704 via a bus 708. Processor 702 is also electrically coupled to an I/O interface 710 by bus 708. A network interface 712 is also electrically connected to processor 702 via bus 708. Network interface 712 is connected to a network 714, so that processor 702 and computer-readable storage medium 704 are capable of connecting to external elements via network 714. Processor 702 is configured to execute computer program code 706 encoded in computer-readable storage medium 704 in order to cause EDA system 700 to be usable for performing a portion or all of the noted processes and/or methods. In one or more embodiments, processor 702 is a central processing unit (CPU), a multi-processor, a distributed processing system, an application specific integrated circuit (ASIC), and/or a suitable processing unit.

In one or more embodiments, computer-readable storage medium 704 is an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

Figure 8:
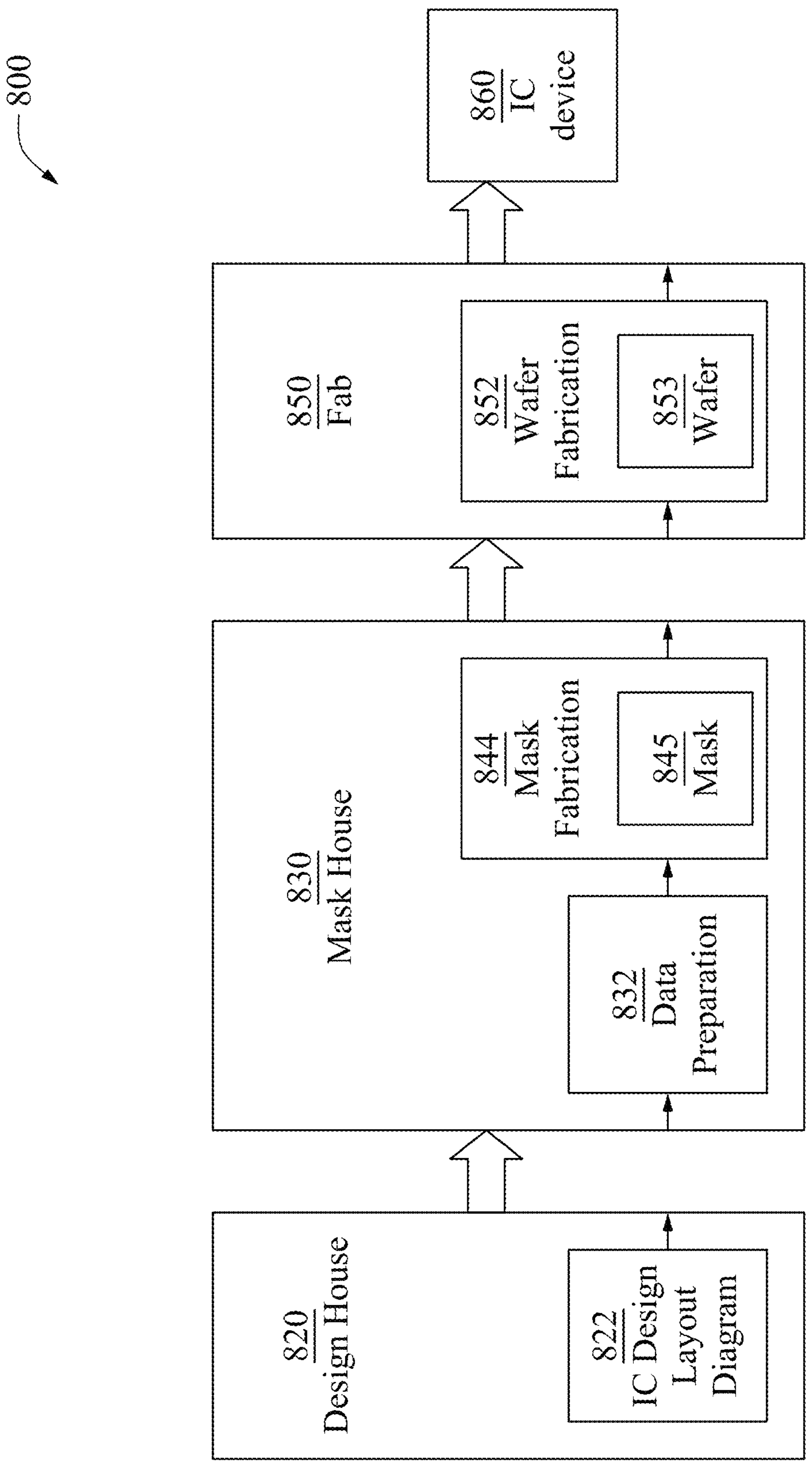
FIG. 8 is a block diagram of a semiconductor device manufacturing system, and an IC manufacturing flow associated therewith, in accordance with some embodiments.

In one or more embodiments, storage medium 704 stores computer program code 706 configured to cause EDA system 700 (where such execution represents (at least in part) the EDA tool) to be usable for performing a portion or all of the noted processes and/or methods. In one or more embodiments, storage medium 704 also stores information which facilitates performing a portion or all of the noted processes and/or methods. In one or more embodiments, storage medium 704 stores library 707 of standard cells including such standard cells corresponding to cells disclosed herein. In one or more embodiments, storage medium 704 stores one or more layout diagrams 709 corresponding to one or more layouts disclosed herein, e.g., IC design layout diagram 822 (FIG. 8).

EDA system 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702.

EDA system 700 also includes network interface 712 coupled to processor 702. Network interface 712 allows EDA system 700 to communicate with network 714, to which one or more other computer systems are connected. Network interface 712 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 700.

EDA system 700 is configured to receive information through I/O interface 710. The information received through I/O interface 710 includes one or more of instructions, data, design rules, libraries of standard cells, and/or other parameters for processing by processor 702. The information is transferred to processor 702 via bus 708. EDA system 700 is configured to receive information related to a UI through I/O interface 710. The information is stored in computer-readable medium 704 as user interface (UI) 742.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 700. In some embodiments, a layout diagram which includes standard cells is generated using a tool such as VRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

FIG. 8 is a block diagram of semiconductor device, e.g., an integrated circuit (IC), manufacturing system 800, and an IC manufacturing flow associated therewith, in accordance with some embodiments.

In some embodiments, based on a layout diagram, e.g., one or more of the layout diagrams disclosed herein in accordance with one or more corresponding embodiments, or the like, at least one of (A) one or more semiconductor masks or (B) at least one component in a layer of a semiconductor integrated circuit is fabricated using manufacturing system 800.

In FIG. 8, IC manufacturing system 800 includes entities, such as a design house 820, a mask house 830, and an IC manufacturer/fabricator ("fab") 850, that interact with one another in the design, development, and manufacturing cycles and/or services related to manufacturing an IC device 860. The entities in system 800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 850 is owned by a single larger company. In some embodiments, two or more of design house 820, mask house 830, and IC fab 850 coexist in a common facility and use common resources.

Design house (or design team) 820 generates an IC design layout diagram 822. IC design layout diagram 822 includes various geometrical patterns designed for an IC device 860. The geometrical patterns correspond to patterns of metal, oxide, or semiconductor layers that make up the various components of IC device 860 to be fabricated. The various layers combine to form various IC features. For example, a portion of IC design layout diagram 822 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 820 implements a proper design procedure to form IC design layout diagram 822. The design procedure includes one or more of logic design, physical design or place and route. IC design layout diagram 822 is presented in one or more data files having information of the geometrical patterns. For example, IC design layout diagram 822 can be expressed in a GDSII file format or DFII file format.

Mask house 830 includes data preparation 832 and mask fabrication 844. Mask house 830 uses IC design layout diagram 822 to manufacture one or more masks 845 to be used for fabricating the various layers of IC device 860 according to IC design layout diagram 822. Mask house 830 performs mask data preparation 832, where IC design layout diagram 822 is translated into a representative data file ("RDF"). Mask data preparation 832 provides the RDF to mask fabrication 844. Mask fabrication 844 includes a mask writer. A mask writer converts the RDF to an image on a substrate, such as a mask (reticle) 845 or a semiconductor wafer 853. The design layout diagram 822 is manipulated by mask data preparation 832 to comply with particular characteristics of the mask writer and/or requirements of IC fab 850. In FIG. 8, mask data preparation 832 and mask fabrication 844 are illustrated as separate elements. In some embodiments, mask data preparation 832 and mask fabrication 844 can be collectively referred to as mask data preparation.

In some embodiments, mask data preparation 832 includes optical proximity correction (OPC) which uses lithography enhancement techniques to compensate for image errors, such as those that can arise from diffraction, interference, other process effects and the like. OPC adjusts IC design layout diagram 822. In some embodiments, mask data preparation 832 includes further resolution enhancement techniques (RET), such as off-axis illumination, sub-resolution assist features, phase-shifting masks, other suitable techniques, and the like or combinations thereof. In some embodiments, inverse lithography technology (LT) is also used, which treats OPC as an inverse imaging problem.

In some embodiments, mask data preparation 832 includes a mask rule checker (MRC) that checks the IC design layout diagram 822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 822 to compensate for limitations during mask fabrication 844, which may undo part of the modifications performed by OPC in order to meet mask creation rules.

In some embodiments, mask data preparation 832 includes lithography process checking (LPC) that simulates processing that will be implemented by IC fab 850 to fabricate IC device 860. LPC simulates this processing based on IC design layout diagram 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 822.

It should be understood that the above description of mask data preparation 832 has been simplified for the purposes of clarity. In some embodiments, data preparation 832 includes additional features such as a logic operation (LOP) to modify the IC design layout diagram 822 according to manufacturing rules. Additionally, the processes applied to IC design layout diagram 822 during data preparation 832 may be executed in a variety of different orders.

After mask data preparation 832 and during mask fabrication 844, a mask 845 or a group of masks 845 are fabricated based on the modified IC design layout diagram 822. In some embodiments, mask fabrication 844 includes performing one or more lithographic exposures based on IC design layout diagram 822. In some embodiments, an electron-beam (e-beam) or a mechanism of multiple e-beams is used to form a pattern on a mask (photomask or reticle) 845 based on the modified IC design layout diagram 822. Mask 845 can be formed in various technologies. In some embodiments, mask 845 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 845 includes a transparent substrate (e.g., fused quartz) and an opaque material (e.g., chromium) coated in the opaque regions of the binary mask. In another example, mask 845 is formed using a phase shift technology. In a phase shift mask (PSM) version of mask 845, various features in the pattern formed on the phase shift mask are configured to have proper phase difference to enhance the resolution and imaging quality. In various examples, the phase shift mask can be attenuated PSM or alternating PSM. The mask(s) generated by mask fabrication 844 is used in a variety of processes. For example, such a mask(s) is used in an ion implantation process to form various doped regions in semiconductor wafer 853, in an etching process to form various etching regions in semiconductor wafer 853, and/or in other suitable processes.

IC fab 850 includes wafer fabrication 852. IC fab 850 is an IC fabrication business that includes one or more manufacturing facilities for the fabrication of a variety of different IC products. In some embodiments, IC Fab 850 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 850 uses mask(s) 845 fabricated by mask house 830 to fabricate IC device 860. Thus, IC fab 850 at least indirectly uses IC design layout diagram 822 to fabricate IC device 860. In some embodiments, semiconductor wafer 853 is fabricated by IC fab 850 using mask(s) 845 to form IC device 860. In some embodiments, the IC fabrication includes performing one or more lithographic exposures based at least indirectly on IC design layout diagram 822. Semiconductor wafer 853 includes a silicon substrate or other proper substrate having material layers formed thereon. Semiconductor wafer 853 further includes one or more of various doped regions, dielectric features, multilevel interconnects, and the like (formed at subsequent manufacturing steps).

Details regarding an integrated circuit (IC) manufacturing system (e.g., system 800 of FIG. 8), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

In an embodiment, a method of manufacturing a semiconductor device comprises, for a layout diagram stored on a non-transitory computer-readable medium and including a first level of metallization (M_1st level) representing a first layer of metallization in the semiconductor device. Generating the layout diagram including identifying, in the layout diagram, a filler cell and a first functional cell substantially abutting the filler cell in a first direction, the filler and first functional cells representing corresponding non-functional and first functional cell regions in the semiconductor device. The first functional cell including first and second boundaries relative to the first direction (side boundaries), the second side boundary substantially abutting the filler cell; first wiring patterns extending substantially in the first direction in the M_1st level and representing corresponding first conductors in the first functional cell region; first and second groups of cut patterns overlying corresponding portions of the first wiring patterns, and being substantially aligned with the corresponding first and second side boundaries so as to render the corresponding first wiring patterns as being intra-cell. Generating the layout diagram further including adjusting, in the first direction, one or more locations of corresponding one or more selected cut patterns of the second group thereby correspondingly elongating one or more selected ones of the first wiring patterns so as to be corresponding first elongated wiring patterns which extend across the second boundary of the first functional cell into the filler cell. Each of the side boundaries extends substantially in a second direction substantially perpendicular to the first direction. In an embodiment, the method further comprises, based on the layout diagram, at least one of: (A) making one or more photolithographic exposure; (B) fabricating one or more semiconductor masks; or (C) fabricating at least one component in a layer of a semiconductor integrated circuit. In an embodiment, the layout diagram further includes a first level of interconnection (VIA_1st level) overlying the M_1st level and representing a first layer of interconnection overlying the first layer of metallization in the semiconductor device; and the generating the layout diagram further includes: generating a first via pattern in the V_1st level; and locating the first via pattern correspondingly over a corresponding first one of the first elongated wiring patterns such that the first via pattern is located in the filler cell. In an embodiment, the layout diagram further includes a second level of metallization (M_2nd level) overlying the VIA_1st level and representing a second layer of interconnection overlying the first layer of interconnection in the semiconductor device; and the generating the layout diagram further includes: generating a second wiring pattern in the M_2nd level which extends substantially in the second direction; and locating the second wiring pattern correspondingly over the first via pattern such that the second wiring pattern is located in the filler cell. In an embodiment, a size, in the first direction, of the filler cell is one contacted poly pitch (CPP). In an embodiment, a size, in the first direction, of the filler cell is at least two multiples of a contacted poly pitch (CPP); and the generating the layout diagram further includes: generating a second via pattern in the V_1st level; and locating the second via pattern correspondingly over a corresponding second one of the first elongated wiring patterns such that the second via pattern is located in the filler cell; generating a third wiring pattern in the M_2nd level which extends substantially in the second direction; and locating the third wiring pattern correspondingly over the second via pattern such that the third wiring pattern is located in the filler cell. In an embodiment, the first elongated wiring patterns correspond to either odd ones or even ones of the first wiring patterns. In an embodiment, the first elongated wiring patterns correspond to all of the first wiring patterns. In an embodiment, the filler cell includes third and fourth side boundaries, the third side boundary substantially abutting the second side boundary of the first functional cell; the layout diagram further includes: a second functional cell substantially abutting the fourth side boundary of the filler cell, the second functional cell representing a second functional cell region in the semiconductor device; the second functional cell including: fifth and sixth side boundaries, the fifth side boundary substantially abutting the fourth side boundary of the filler cell; second wiring patterns extending substantially in the first direction in the M_1st level and representing corresponding second conductors in the second functional cell region; third and fourth groups of cut patterns overlying corresponding portions of the second wiring patterns, and being substantially aligned with the corresponding fifth and sixth side boundaries so as to render the corresponding second wiring patterns as being intra-cell; and the method further comprises: adjusting, in the first direction, one or more locations of corresponding one or more selected cut patterns of the third group thereby correspondingly elongating one or more selected ones of the second wiring patterns so as to be corresponding second elongated wiring patterns which extend across the fifth side boundary of the first functional cell into the filler cell. In an embodiment, the first elongated wiring patterns and the second elongated wiring patterns define corresponding first and second profiles, relative to the first direction, the second profile being a substantially complementary shape with respect to the first profile. In an embodiment, at least one of the first elongated wiring patterns and at least one of the second elongated wiring patterns are substantially collinear and, relative to the second direction, overlapping so as to collectively represent a conductor which extends from the first functional cell region through the non-functional cell region and into the second functional cell region of the semiconductor device.

In an embodiment, a system for manufacturing a semiconductor device comprises: at least one processor; and at least one memory including computer program code for one or more programs. The at least one memory, the computer program code and the at least one processor are configured to cause the system to execute, for a layout diagram stored on a non-transitory computer-readable medium and including a first level of metallization (M_1st level) and a first level of interconnection (VIA_1st level) correspondingly representing a first layer of metallization and an overlying first layer of interconnection in the semiconductor device, generating the layout diagram including: identifying, in the layout diagram, a filler cell and a first functional cell substantially abutting the filler cell in a first direction, the filler and first functional cells representing corresponding non-functional and first functional cell regions in the semiconductor device; the first functional cell including: first and second boundaries relative to the first direction (side boundaries), the second side boundary substantially abutting the filler cell; first wiring patterns extending substantially in the first direction in the M_1st level and representing corresponding first conductors in the first functional cell region; and first and second groups of cut patterns overlying corresponding portions of the first wiring patterns, and being substantially aligned with the corresponding first and second side boundaries so as to render the corresponding first wiring patterns as being intra-cell; adjusting, in the first direction, one or more locations of corresponding one or more selected cut patterns of the second group thereby correspondingly elongating one or more selected ones of the first wiring patterns so as to be corresponding first elongated wiring patterns which extend across the second boundary of the first functional cell into the filler cell; generating a first via pattern in the V_1st level; and locating the first via pattern correspondingly over a corresponding first one of the first elongated wiring patterns such that the first via pattern is located in the filler cell. Each of the side boundaries extends substantially in a second direction substantially perpendicular to the first direction. In an embodiment, the system further comprises at least one of: a masking facility configured to fabricate one or more semiconductor masks based on based on the layout diagram; or a fabricating facility configured to fabricate at least one component in a layer of a semiconductor integrated circuit based on the layout diagram. In an embodiment, the layout diagram further includes a second level of metallization (M_2nd level) overlying the VIA_1st level and representing a second layer of metallization overlying the first layer of interconnection in the semiconductor device; and the generating the layout diagram further includes: generating a second wiring pattern in the M_2nd level which extends substantially in the second direction; and locating the second wiring pattern correspondingly over the first via pattern such that the second wiring pattern is located in the filler cell. In an embodiment, a size, in the first direction, of the filler cell is one contacted poly pitch (CPP). In an embodiment, a size, in the first direction, of the filler cell is at least two multiples of a contacted poly pitch (CPP); and the generating the layout diagram further includes: generating a second via pattern in the V_1st level; and locating the second via pattern correspondingly over a corresponding second one of the first elongated wiring patterns such that the second via pattern is located in the filler cell; generating a third wiring pattern in the M_2nd level which extends substantially in the second direction; and locating the third wiring pattern correspondingly over the second via pattern such that the third wiring pattern is located in the filler cell. In an embodiment, the filler cell includes third and fourth side boundaries, the third side boundary substantially abutting the second side boundary of the first functional cell; the layout diagram further includes: a second functional cell substantially abutting the fourth side boundary of the filler cell, the second functional cell representing a second functional cell region in the semiconductor device; the second functional cell including: fifth and sixth side boundaries, the fifth side boundary substantially abutting the fourth side boundary of the filler cell; second wiring patterns extending substantially in the first direction in the M_1st level and representing corresponding second conductors in the second functional cell region; third and fourth groups of cut patterns overlying corresponding portions of the second wiring patterns, and being substantially aligned with the corresponding fifth and sixth side boundaries so as to render the corresponding second wiring patterns as being intra-cell. The method further comprises: adjusting, in the first direction, one or more locations of corresponding one or more selected cut patterns of the third group thereby correspondingly elongating one or more selected ones of the second wiring patterns so as to be corresponding second elongated wiring patterns which extend across the fifth side boundary of the first functional cell into the filler cell; and the first elongated wiring patterns and the second elongated wiring patterns defining corresponding first and second profiles, relative to the first direction, the second profile being a substantially complementary shape with respect to the first profile.

In an embodiment, a semiconductor device comprises a first layer of metallization (M_1st layer) in the semiconductor device; and a filler cell region and a first functional cell region substantially abutting the filler cell region in a first direction. The first functional cell region including: first conductors extending substantially in the first direction in the M_1st laver; the first functional cell region further including: a first conductive structure coupling a first one of the first conductors to a source/drain region of a transistor; or a second conductive structure coupling a second one of the first conductors to a gate structure of a transistor; one or more selected ones of the first conductors being elongated, relative to first direction, so as to extend beyond the first functional cell region into the filler cell region; and the filler cell region not including: a third conductive structure coupling a conductive segment in the M_1st layer to a source/drain region of a transistor; nor a fourth conductive structure coupling a conductive segment in the M_1st layer to a gate structure of a transistor. In an embodiment, the semiconductor device further comprises a first layer of interconnection (VIA_1st layer) overlying the M_1st layer; and a first via structure in the V_1st layer, the first via structure being located over a corresponding first one of the selected ones of the first conductors and in the filler cell region.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of manufacturing a semiconductor device, for which a layout diagram is stored on a non-transitory computer-readable medium, the layout diagram including a first level of metallization (M_1st level) representing a first layer of metallization in the semiconductor device, the method comprising generating the layout diagram including:

identifying, in the layout diagram, a filler cell and a first functional cell substantially abutting the filler cell in a first direction, the filler and first functional cells representing corresponding non-functional and first functional cell regions in the semiconductor device;

the first functional cell including:

first and second boundaries relative to the first direction (side boundaries), the second side boundary substantially abutting the filler cell;

first wiring patterns extending substantially in the first direction in the M_1st level and representing corresponding first conductors in the first functional cell region; and first and second groups of cut patterns overlying corresponding portions of the first wiring patterns, the first group overlapping the second side boundary;

adjusting, in the first direction, one or more locations of corresponding one or more selected cut patterns of the second group thereby correspondingly elongating one or more selected ones of the first wiring patterns so as to be corresponding first elongated wiring patterns which extend across the second boundary of the first functional cell into the filler cell; and wherein each of the side boundaries extends substantially in a second direction substantially perpendicular to the first direction.

2. The method of claim 1, further comprising:

based on the layout diagram, at least one of:

(A) making one or more photolithographic exposure;

(B) fabricating one or more semiconductor masks; or (C) fabricating at least one component in a layer of a semiconductor integrated circuit.

3. The method of claim 1, wherein:

the layout diagram further includes a first level of interconnection (VIA_1st level) overlying the M_1st level and representing a first layer of interconnection overlying the first layer of metallization in the semiconductor device; and the generating the layout diagram further includes:

generating a first via pattern in the V_1st level; and locating the first via pattern correspondingly over a corresponding first one of the first elongated wiring patterns such that the first via pattern is located in the filler cell.

4. The method of claim 3, wherein:

the layout diagram further includes a second level of metallization (M_2nd level) overlying the VIA_1st level and representing a second layer of interconnection overlying the first layer of interconnection in the semiconductor device; and the generating the layout diagram further includes:

generating a second wiring pattern in the M_2nd level which extends substantially in the second direction; and locating the second wiring pattern correspondingly over the first via pattern such that the second wiring pattern is located in the filler cell.

5. The method of claim 4, wherein:

a size, in the first direction, of the filler cell is one contacted poly pitch (CPP).

6. The method of claim 4, wherein:

a size, in the first direction, of the filler cell is at least two multiples of a contacted poly pitch (CPP); and the generating the layout diagram further includes:

generating a second via pattern in the V_1st level; and locating the second via pattern correspondingly over a corresponding second one of the first elongated wiring patterns such that the second via pattern is located in the filler cell;

generating a third wiring pattern in the M_2nd level which extends substantially in the second direction; and locating the third wiring pattern correspondingly over the second via pattern such that the third wiring pattern is located in the filler cell.

7. The method of claim 1, wherein:

a size, in the first direction, of the filler cell is one contacted poly pitch (CPP).

8. The method of claim 1, wherein:

the first elongated wiring patterns correspond to either odd ones or even ones of the first wiring patterns.

9. The method of claim 1, wherein:

the first elongated wiring patterns correspond to all of the first wiring patterns.

10. The method of claim 1, wherein:

the filler cell includes third and fourth side boundaries, the third side boundary substantially abutting the second side boundary of the first functional cell;

the layout diagram further includes:

a second functional cell substantially abutting the fourth side of the filler cell, the second functional cell representing a second functional cell region in the semiconductor device;

the second functional cell including:

fifth and sixth side boundaries, the fifth side boundary substantially abutting the fourth side boundary of the filler cell;

second wiring patterns extending substantially in the first direction in the M_1st level and representing corresponding second conductors in the second functional cell region;

third and fourth groups of cut patterns overlying corresponding portions of the second wiring patterns, and being substantially aligned with the corresponding fifth and sixth side boundaries so as to render the corresponding second wiring patterns as being intra-cell; and the method further comprises:

adjusting, in the first direction, one or more locations of corresponding one or more selected cut patterns of the third group thereby correspondingly elongating one or more selected ones of the second wiring patterns so as to be corresponding second elongated wiring patterns which extend across the fifth side boundary of the first functional cell into the filler cell.

11. The method of claim 10, wherein:

the first elongated wiring patterns and the second elongated wiring patterns define corresponding first and second profiles, relative to the first direction, the second profile being a substantially complementary shape with respect to the first profile.

12. The method of claim 10, wherein:

at least one of the first elongated wiring patterns and at least one of the second elongated wiring patterns are substantially collinear and, relative to the second direction, overlapping so as to collectively represent a conductor which extends from the first functional cell region through the non-functional cell region and into the second functional cell region of the semiconductor device.

13. A method of manufacturing a semiconductor device, for which a corresponding layout diagram is stored on a non-transitory computer-readable medium, the layout diagram including a first level of metallization (M_1st level) and a first level of interconnection (VIA_1st level) correspondingly representing a first layer of metallization and an overlying first layer of interconnection in the semiconductor device, the method comprising generating the layout diagram including:

identifying, in the layout diagram, a filler cell and a first functional cell substantially abutting the filler cell in a first direction, the filler and first functional cells rep resenting corresponding non-functional and first functional cell regions in the semiconductor device;

the first functional cell including:

first and second boundaries relative to the first direction (side boundaries), the second side boundary substantially abutting the filler cell;

first wiring patterns extending substantially in the first direction in the M_1st level and representing corresponding first conductors in the first functional cell region; and first and second groups of cut patterns overlying corresponding portions of the first wiring patterns, the first group overlapping the second side boundary;

adjusting, in the first direction, one or more locations of corresponding one or more selected cut patterns of the second group thereby correspondingly elongating one or more selected ones of the first wiring patterns so as to be corresponding first elongated wiring patterns which extend across the second boundary of the first functional cell into the filler cell;

generating a first via pattern in the V_1st level; and locating the first via pattern correspondingly over a corresponding first one of the first elongated wiring patterns such that the first via pattern is located in the filler cell; and wherein each of the side boundaries extends substantially in a second direction substantially perpendicular to the first direction.

14. The method of claim 13, wherein:

the layout diagram further includes a second level of metallization (M_2nd level) overlying the VIA_1st level and representing a second layer of metallization overlying the first layer of interconnection in the semiconductor device; and the generating the layout diagram further includes:

generating a second wiring pattern in the M_2nd level which extends substantially in the second direction; and locating the second wiring pattern correspondingly over the first via pattern such that the second wiring pattern is located in the filler cell.

15. The method of claim 14, wherein:

a size, in the first direction, of the filler cell is one contacted poly pitch (CPP).

16. The method of claim 14, wherein:

a size, in the first direction, of the filler cell is at least two multiples of a contacted poly pitch (CPP); and the generating the layout diagram further includes:

generating a second via pattern in the V_1st level; and locating the second via pattern correspondingly over a corresponding second one of the first elongated wiring patterns such that the second via pattern is located in the filler cell;

generating a third wiring pattern in the M_2nd level which extends substantially in the second direction; and locating the third wiring pattern correspondingly over the second via pattern such that the third wiring pattern is located in the filler cell.

17. The method of claim 16, wherein:

the filler cell includes third and fourth side boundaries, the third side boundary substantially abutting the second side boundary of the first functional cell;

the layout diagram further includes:

a second functional cell substantially abutting the fourth side boundary of the filler cell, the second functional cell representing a second functional cell region in the semiconductor device;

the second functional cell including:

fifth and sixth side boundaries, the fifth side boundary substantially abutting the fourth side boundary of the filler cell;

second wiring patterns extending substantially in the first direction in the M_1st level and representing corresponding second conductors in the second functional cell region;

third and fourth groups of cut patterns overlying corresponding portions of the second wiring patterns, and being substantially aligned with the corresponding fifth and sixth side boundaries so as to render the corresponding second wiring patterns as being intra-cell; and the method further comprises:

adjusting, in the first direction, one or more locations of corresponding one or more selected cut patterns of the third group thereby correspondingly elongating one or more selected ones of the second wiring patterns so as to be corresponding second elongated wiring patterns which extend across the fifth side boundary of the first functional cell into the filler cell; and the first elongated wiring patterns and the second elongated wiring patterns defining corresponding first and second profiles, relative to the first direction, the second profile being a substantially complementary shape with respect to the first profile.

18. A method of manufacturing a semiconductor device, for which a layout diagram is stored on a non-transitory computer-readable medium, the layout diagram including a first level of metallization (M_1st level) representing a first layer of metallization in the semiconductor device, the method comprising generating the layout diagram including:

identifying, in the layout diagram, a filler cell, a first functional cell and a second functional cell, the first functional cell substantially abutting the filler cell in a first direction, the second functional cell substantially abutting the filler cell in a second direction substantially perpendicular to the first direction, the filler, first functional and second functional cells representing corresponding non-functional, first functional and second functional cell regions in the semiconductor device;

the first functional cell including:

first and second boundaries relative to the first direction (side boundaries) extending substantially in the second direction, the second side boundary substantially abutting the filler cell;

first wiring patterns extending substantially in the first direction in the M_1st level and representing corresponding first conductors in the first functional cell region; and first and second groups of cut patterns overlying corresponding portions of the first wiring patterns, the first group overlapping the second side boundary;

the filler cell including third and fourth side boundaries, the third side boundary substantially abutting the second side boundary of the first functional cell;

the second functional cell including:

fifth and sixth side boundaries, the fifth side boundary substantially abutting the fourth side boundary of the filler cell;

second wiring patterns extending substantially in the first direction in the M_1st level and representing corresponding second conductors in the second functional cell region;

third and fourth groups of cut patterns overlying corresponding portions of the second wiring patterns, and being substantially aligned with the corresponding fifth and sixth side boundaries so as to render the corresponding second wiring patterns as being intra-cell; and adjusting, in the first direction, one or more locations of corresponding one or more selected cut patterns correspondingly of the second and third groups thereby correspondingly elongating one or more selected ones of the first and second wiring patterns so as to be corresponding first and second elongated wiring patterns, the first elongated wiring patterns extending across the second boundary of the first functional cell into the filler cell, and the second elongated wiring patterns extending across the fifth side boundary of the first functional cell into the filler cell.

19. The method of claim 18, wherein:

the first elongated wiring patterns and the second elongated wiring patterns define corresponding first and second profiles, relative to the first direction, the second profile being a substantially complementary shape with respect to the first profile.

20. The method of claim 18, wherein:

at least one of the first elongated wiring patterns and at least one of the second elongated wiring patterns are substantially collinear and, relative to the second direction, overlapping so as to collectively represent a conductor which extends from the first functional cell region through the non-functional cell region and into the second functional cell region of the semiconductor device.

* * * * *